US012394281B2

(12) United States Patent
Hawkins et al.

(10) Patent No.: US 12,394,281 B2
(45) Date of Patent: *Aug. 19, 2025

(54) NON-STANDARD PROGRESSIVE CUSTOMIZATION WITH UNIFORM EXPECTED VALUES

(71) Applicant: Aristocrat Technologies Australia Pty Limited, North Ryde (AU)

(72) Inventors: Ryan Hawkins, Henderson, NV (US); Stephanie Johns, Las Vegas, NV (US); Yanis Tsombanidis, Las Vegas, NV (US); Robert Honeycutt, Henderson, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 209 days.

This patent is subject to a terminal disclaimer.

(21) Appl. No.: 18/302,514

(22) Filed: Apr. 18, 2023

(65) Prior Publication Data

US 2023/0252851 A1 Aug. 10, 2023

Related U.S. Application Data

(63) Continuation of application No. 17/092,160, filed on Nov. 6, 2020, now Pat. No. 11,657,677, which is a (Continued)

(51) Int. Cl.
*G07F 17/32* (2006.01)
*G07F 17/34* (2006.01)

(52) U.S. Cl.
CPC ...... *G07F 17/3258* (2013.01); *G07F 17/3209* (2013.01); *G07F 17/3211* (2013.01); (Continued)

(58) Field of Classification Search
CPC ............. G07F 17/3258; G07F 17/3211; G07F 17/3223; G07F 17/3209; G07F 17/3216; (Continued)

(56) References Cited

U.S. PATENT DOCUMENTS 6,048,269 A 4/2000 Burns
6,142,876 A 11/2000 Cumbers
(Continued)

FOREIGN PATENT DOCUMENTS

WO 2005026909 3/2005

OTHER PUBLICATIONS

Australian Examination Report No. 1 issued in App. No. AU2018226503, dated Jul. 31, 2023, 4 pages.
(Continued)

*Primary Examiner* — Thomas H Henry
(74) *Attorney, Agent, or Firm* — Armstrong Teasdale LLP

(57) ABSTRACT

The disclosed technology describes various embodiments for providing a non-standard progressive jackpot mechanic, which can be used to control an electronic gaming machine ("EGM"). Certain embodiments, for example, comprise inputting wager data identifying a wager selected by a player of a reel game offered by the EGM, wherein the reel game includes one or more progressive jackpot awards; and in response to the inputting, computing updated values of the one or more progressive jackpot awards, wherein the updated values are computed based at least in part on a multiplier value that alters a first set of the one or more progressive jackpot awards into a second set of the one or more progressive jackpot awards different than the first set.

20 Claims, 11 Drawing Sheets

Related U.S. Application Data continuation of application No. 16/120,032, filed on Aug. 31, 2018, now Pat. No. 10,832,524.

(60) Provisional application No. 62/555,923, filed on Sep. 8, 2017.

(52) U.S. Cl.
CPC ...... *G07F 17/3216* (2013.01); *G07F 17/3223* (2013.01); *G07F 17/3213* (2013.01); *G07F 17/3239* (2013.01); *G07F 17/34* (2013.01)

(58) Field of Classification Search
CPC ... G07F 17/3239; G07F 17/34; G07F 17/3213
See application file for complete search history.

(56) References Cited

U.S. PATENT DOCUMENTS

| | | | | |
|---|---|---|---|---|
| 6,685,567 | B2 | 2/2004 | Cockerille | |
| D557,702 | S | 12/2007 | Viegers | |
| D679,722 | S | 4/2013 | Ray | |
| D702,701 | S | 4/2014 | Scharfeld | |
| 8,932,129 | B2 | 1/2015 | Powell | |
| D750,128 | S | 2/2016 | Capela | |
| D765,136 | S | 8/2016 | Lee | |
| D772,240 | S | 11/2016 | Edstrom | |
| D773,512 | S | 12/2016 | Miura | |
| D785,664 | S | 5/2017 | Yao | |
| D786,271 | S | 5/2017 | Randon | |
| D790,563 | S | 6/2017 | Lam | |
| D792,451 | S | 7/2017 | Jeon | |
| D801,358 | S | 10/2017 | Jungmann | |
| 2002/0160830 | A1 | 10/2002 | Stern | |
| 2006/0287077 | A1 | 12/2006 | Grav | |
| 2007/0026935 | A1 | 2/2007 | Wolf | |
| 2007/0155509 | A1 | 7/2007 | Wiltshire | |
| 2009/0054139 | A1 | 2/2009 | Anderson | |
| 2015/0018070 | A1 | 1/2015 | Meyer | |
| 2016/0093147 | A1 | 3/2016 | Penacho | |
| 2016/0189471 | A1 | 6/2016 | Penacho | |
| 2016/0321857 | A1* | 11/2016 | Meyer | G07F 17/326 |
| 2016/0335854 | A1* | 11/2016 | Kitamura | G07F 17/3244 |
| 2018/0078847 | A1 | 3/2018 | Sorreta | |

OTHER PUBLICATIONS

Australian Examination Report No. 2 issued in App. No. AU2018226503, dated Jul. 23, 2024, 4 pages.

Schneier, "Applied Cryptography, Protocols, Algorithms, and Source Code in C," 2nd Edition, John Wiley & Sons, Inc., 662 pp. (1996).

Notice of Allowance dated Jul. 8, 2020 for U.S. Appl. No. 16/120,032 (pp. 1-7).

Office Action (Non-Final Rejection) dated Jan. 31, 2022 for U.S. Appl. No. 17/092,160 (pp. 1-8).

Office Action (Final Rejection) dated Jun. 20, 2022 for U.S. Appl. No. 17/092,160 (pp. 1-9).

Office Action (Non-Final Rejection) dated Sep. 23, 2022 for U.S. Appl. No. 17/092,160 (pp. 1-10).

Office Action (Notice of Allowance and Fees Due (PTOL-85)) dated Jan. 19, 2023 for U.S. Appl. No. 17/092,160 (pp. 1-7).

* cited by examiner

NON-STANDARD PROGRESSIVE CUSTOMIZATION WITH UNIFORM EXPECTED VALUES

CROSS REFERENCE TO RELATED APPLICATION

This patent application is a continuation of and claims priority to U.S. patent application Ser. No. 17/092,160, filed Nov. 6, 2020, which is a continuation of U.S. patent application Ser. No. 16/120,032, now U.S. Pat. No. 10,832,524, filed Aug. 31, 2018, which claims the benefit of U.S. Provisional Patent Application No. 62/555,923, filed Sep. 8, 2017, the disclosures of which are hereby incorporated by reference herein in their entireties.

TECHNICAL FIELD

This application concerns electronic gaming machines ("EGMs"), and in particular to control mechanisms for customizing progressive jackpot awards.

BACKGROUND

EGMs provide a variety of wagering games, such as slot games, video poker games, video blackjack games, roulette games, video bingo games, keno games and other types of games, which are frequently offered at casinos and other locations for use by players. Play on an EGM typically involves a player placing a wager on one or more outcomes of a base game, also referred to as a primary game. Many EGMs also offer one or more available progressive jackpots that may be awarded to the player. The progressive jackpot may be local to a single EGM or part of a linked system of multiple EGMs that "share" the progressive jackpot.

In a traditional progressive arrangement, the odds of hitting the progressive jackpot award is directly proportional to the bet. That is, the player betting 200 credits per game is twice as likely to hit the progressive as the player betting 100 credits per game. In such traditional systems, the jackpot award is the same across all bets, but the odds of hitting the jackpot increase directly proportionally as the bet increases (e.g., the hit rate of the progressive jackpot is reduced by 50% with a doubling of a wager). In addition, with respect to a traditional progressive system, the increment rate across bets is consistent. For example, a 1% increment rate adds 1% of all wagers to the progressive. Thus, for example, the player betting 100 credits adds 1 credit to the progressive for each game played, and the player betting 200 credits adds 2 credits to the progressive for each game played. This is also true for games of different denominations linked to the same progressive jackpot. For example, the nickel player is 5 times more likely to hit the progressive than the penny player. In this traditional scenario, the linked jackpot award is the same across all denominations, but the odds of hitting the jackpot increase proportionally as the denomination increases.

Such traditional (or standard) progressive mechanics are extremely limiting in terms of game design and progressive jackpot offerings. Further, such traditional (or standard) progressive standards tend to produce higher hit rates of lower-tier progressive pools that discourage players willing to bet more from accessing higher values of those lower-tier progressive pools. Accordingly, there is need for a more flexible framework for computing progressive jackpot awards that help equalize the value of game play across a variety of wagering values and/or possibilities. Still further, it is desirable for such flexible frameworks to achieve a uniform expected value across such wagering values and/or possibilities.

SUMMARY

In summary, the detailed description presents innovations for providing a flexible framework for computing progressive jackpot awards in one or more electronic gaming machines ("EGMs"). Particular embodiments provide progressive jackpot award control methods that achieve a uniform (constant) expected value across such wagering values and/or possibilities.

Particular embodiments concern systems and methods for maintaining a uniform expected value across all bets and denominations while allowing progressive award schemes to be developed with non-standard startups, increment rates, hit rates, etc. For example, using embodiments of the disclosed technology, a game designer may create a custom progressive experience. Further, in certain embodiments, the expected value is controlled by the judicious use of a multiplier (e.g., which can vary based on the current bet and denomination) applied to the progressive award at the time when the progressive is won.

In some of the embodiments disclosed herein, methods of controlling an electronic gaming machine ("EGM") are disclosed, where the method comprises inputting wager data identifying a wager selected by a player of a reel game offered by the EGM, wherein the reel game includes one or more progressive jackpot awards; and in response to the inputting, computing updated values of the one or more progressive jackpot awards, wherein the updated values are computed based at least in part on a multiplier value that alters a first set of the one or more progressive jackpot awards into a second set of the one or more progressive jackpot awards different than the first set. In certain implementations, the updated values of the one or more progressive jackpot awards on a display screen of the EGM. In further implementations, the updated values of the one or more progressive jackpot awards are displayed to the player on a display screen of the EGM when the player selects a different wagering option and before the player finalizes the wager. The different wagering option can be one of a change in a denomination for the wager or a change in an amount of the wager. In particular implementations, the multiplier value creates a constant expected value for the player. For example, the reel game can have a constant hit rate across all wagers for a respective one of the one or more progressive jackpot awards. In other examples, the reel game can have a non-constant hit rate across all wagers for a respective one of the one or more progressive jackpot awards but also uses the multiplier value to achieve the constant expected value for the player. In further embodiments, the multiplier value creates a constant expected value for the player for one or more of a. different denominations being selected for the wager; and/or b. different bet amounts for the wager. In some embodiments, the player is awarded two or more instances of a respective one of the one or more progressive jackpot awards, wherein the two or more instances are equal in amount and correspond to the updated value for the respective one of the one or more progressive jackpot awards.

Other embodiments disclosed herein include an electronic gaming machine ("EGM") comprising: a cabinet; a display screen; one or more input buttons; a credit input device; and control logic configured to perform operations to control a user interface of the EGM, the operations comprising: displaying on the display screen a first state of a reel game before a final wager for a next play of the reel game is initiated, the display screen in the first state including a progressive jackpot display area for an available progressive jackpot award, the progressive jackpot display area displaying a first progressive jackpot amount in the first state; and displaying on the display screen a second state of the reel game before the final wager for the next play of the reel game is initiated, the display screen in the second state including the progressive jackpot display area, the progressive jackpot display area in the second state displaying a second progressive jackpot amount, the second progressive jackpot amount being different than the first progressive jackpot amount. In particular implementations, the displaying on the display screen of the second state is responsive to input received from the one or more input buttons, and the input received from the one or more input buttons alters a wager amount for the reel game or a denomination for the reel game. In certain implementations, the control logic is further configured to compute the second progressive jackpot such that a constant expected value is maintained for the reel game in view of the altered wager amount for the reel game or the altered denomination for the reel game. In some implementations, the control logic is further configured to provide a constant hit rate across all wagers for the available progressive jackpot award. In certain implementations, the control logic is further configured to provide a non-constant hit rate across all wagers for the available progressive jackpot award and is further configured to apply a variable multiplier value to achieve a constant expected value across all wagers. In some implementations, the control logic is further configured to use a multiplier value to create a constant expected value for different denominations being selected for a wager for the reel game or different bet amounts for the wager for the reel game. In certain implementations, the control logic is further configured to award the player two or more instances of the available progressive jackpot award, wherein the two or more instances are equal in amount.

Further embodiments disclosed herein include an electronic gaming machine ("EGM") comprising: a credit input device for accepting a wager; a display having a first display area configured to display a jackpot award amount and a second display area configured to display a multiplier amount, said first display area and said second display area being juxtaposed to visually represent that the multiplier amount is to be applied to the displayed jackpot award amount; and a game controller configured to generate the multiplier amount based on the amount of the wager and to display the generated multiplier amount in the second display area. In certain implementations, the game controller is further configured to apply the multiplier amount to the jackpot award amount to create a multiplied jackpot award amount, and the first display area is configured to display the multiplied jackpot award amount, the multiplied jackpot award amount being different than an unmultiplied jackpot award amount. In some implementations, the multiplier amount is applied in order to maintain a constant expected value across different wager amounts.

The innovations can be implemented as part of a method, as part of an EGM or electronic gaming server configured to perform the method, or as part of non-transitory computer-readable media storing computer-executable instructions for causing one or more processors in a computer system to perform the method. The various innovations can be used in combination or separately.

This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures and illustrates a number of examples. Examples may also be capable of other and different applications, and some details may be modified in various respects all without departing from the spirit and scope of the disclosed innovations.

BRIEF DESCRIPTION OF THE DRAWINGS

The following drawings illustrate some features of the disclosed innovations. The drawings are not necessarily drawn to scale.

DETAILED DESCRIPTION

Figure 1:
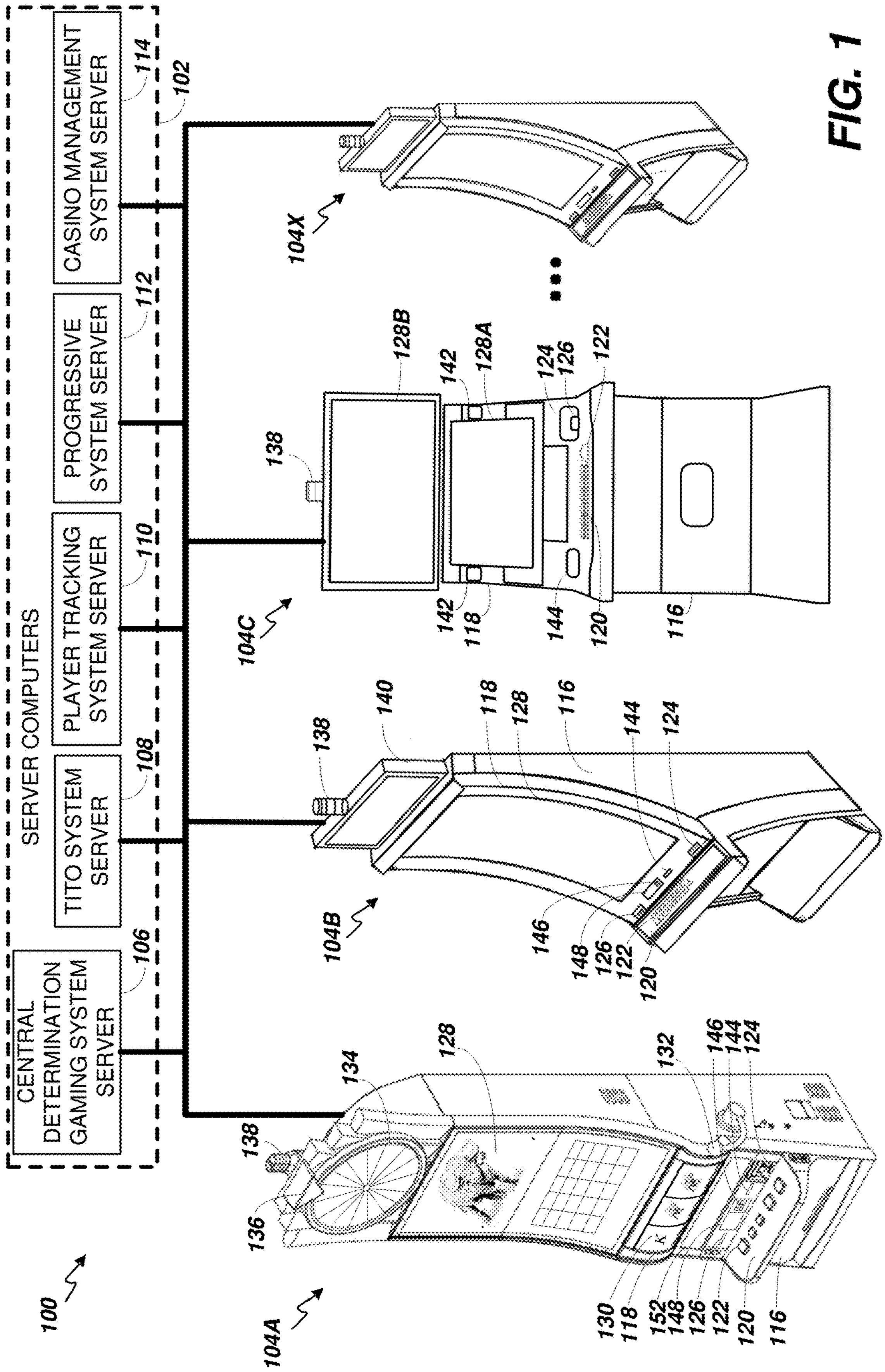
FIG. 1 is a perspective diagram of example EGMs according to some embodiments.

The detailed description presents innovations electronic gaming machines ("EGMs"), and in particular to providing a flexible framework for computing progressive jackpot awards in one or more EGMs. Particular embodiments provide progressive jackpot award control methods that achieve a uniform (constant) expected value across such wagering values and/or possibilities.

In the examples described herein, identical reference numbers in different figures indicate an identical component, module, or operation. More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique/tool does not solve all such problems. It is to be understood that other examples may be utilized and that structural, logical, software, hardware, and electrical changes may be made without departing from the scope of the disclosure. The following description is, therefore, not to be taken in a limited sense. Rather, the scope of the present invention is defined by the appended claims.

I. Terminology

Throughout the description that follows, and unless otherwise specified, the following terms may include and/or encompass the example meanings provided in this section. These terms and illustrative example meanings are provided to clarify the language selected to describe examples both in the specification and in the appended claims.

The term "game" may refer to a gambling event with a beginning and end that may encompass one or more spins, handle pulls, or spans of time. The end of the game may be determined voluntarily (in which a player elects to stop play) or involuntarily (in which the gaming device terminates play). In some examples, a game may include non-gambling events such as pachinko games, skill-based games, non-RTP-based games, bonus games, or the like.

The term "primary game" or "base game" may refer to play resulting from the spinning of standard physical or virtual (e.g., electronic, video or graphical) slot reels, the dealing of physical or virtual (e.g., electronic, video, or graphical) cards, or other game outcomes. For example, the outcome of a primary reel game might be cherry-cherry-bar. The term "primary reel game" or "base reel game" may refer to play result from the spinning of standard physical or virtual slot reels.

The term "bonus game," "bonus feature," "feature game," or "secondary game" may refer to an additional game playable on a gaming device that is separate from the primary game. A bonus game typically does not require the player to wager any additional funds or credits, and a bonus game may include the possibility of winning a relatively large payout. In some cases, a bonus game may require an additional wager.

The term "game play parameter" may refer to one or more variables whose one or more values govern one or more aspects of play at one or more gaming devices, exclusive of variables directly related to payout amounts, pay table selection, and payout probabilities. The value of a game play parameter may be determined by a random selection process. Examples include a number of symbol positions on a spinning reel, a reel strip with a pattern of symbols, a number of bar symbols on a given reel, a number of handle pulls for which a bonus mode will remain active, a probability of a game character appearing on a given handle pull, and a required wager amount per handle pull.

The term "game parameter" may refer to one or more variables whose values govern play at the gaming device and are determined by a random selection process. Game parameters include game play parameters. Examples of game parameters may include a payout for a given combination of symbols on consecutive reels, a position number randomly selected on a spinning reel, a number of a specific type of symbols on a given reel, the values of cards in a hand, and a probability of a game character finding hidden virtual treasure. The term "game parameter value" may refer to a value associated with a game parameter, such as 200 coins, 12 cherry symbols, or a 30% chance of finding treasure.

The term "game parameter value symbol" may refer to a reel symbol that represents a game parameter value, such as a reel symbol displaying "200 coins" or five reels collectively displaying "3 cherry symbols." The game parameter value symbol could also be found on other representations of random events such as spinners (e.g., a segmented wheel with a spinning arrow selector), which could be located on a secondary screen.

The term "symbol" may refer to any indicia displayed on a primary or secondary display, whether moving or stationary, whether animated or static. For example, a reel strip for a reel may include symbols at positions of the reel strip.

The term "gaming device" may refer to any electrical, mechanical, or electro-mechanical device, including an electronic gaming machine ("EGM"), that may accept wagers, step through a process to determine an outcome, and pay winnings based on the outcome. In some examples, the outcome may be randomly generated, as with a typical slot machine; may be generated through a combination of randomness and player skill, as with video poker; or may be generated entirely through player skill. Gaming devices may include slot machines (with virtual and/or mechanical reels), video poker machines, video blackjack machines, video roulette machines, keno machines, video bingo machines, pachinko machines, lottery terminals, handheld gaming devices, and the like. In some embodiments, handheld gaming devices may include smartphones, tablets, and other portable devices. Thus, a gaming device may use specially-configured computer hardware that implements game functionality, or a gaming device may use general-purpose computer hardware that has been programmed to implement game functionality.

The term "handle pull" or "spin" of a game may refer to a single play at a gaming device, whether or not a handle is involved in the play, and whether or not a handle is even included in the gaming device. In other words, a single play could be initiated by a press of a mechanical, electronic, or video overlay (e.g., touchscreen) button or via another activation method. The meaning of "handle pull" or "spin" is intended to be flexible, in that a single handle pull or spin of a game might constitute a single complete game, or a single wager. For example, a handle pull or spin might represent a single spin of the reels or a series of spins which culminate in a final aggregate outcome.

The term "outcome" may refer to a result of a gaming event, such as a specific combination of symbols in a slot machine game, the completion of a puzzle, the attainment of a goal, etc. Diverse types of gaming devices may have widely varying types of outcomes. Several are described in detail herein and still others will be apparent to those of skill in the art based on the present disclosure.

The term "payout" may refer to a prize, an award, winnings, game credits, game tokens, or a bonus associated with a certain outcome or outcomes.

The term "wagering credit" or "wager" may refer to a representation of value, other than a chip, token or wagering instrument, that is used for wagering at a game, gaming device, race book or sports pool and is obtained by the payment of cash or a cash equivalent, the use of a wagering instrument or the electronic transfer of money. The term "wagering instrument" may refer to a representation of value, other than a chip or token, that is issued by a casino or other establishment for use in a cashless wagering system. The term "representation of value" may refer to any instrumentality used or won by a player in a game whether the instrumentality may be redeemed for cash or not. For example, "comp" points, bonus points, game rewards, a coupon for a free drink, a complimentary night stay at a hotel, a poker chip, a voucher, etc.

The term "return to player percentage" or "RTP" may refer to the average percentage of all the wagered money a gaming device will pay back in winnings to a player for a given amount wagered. For example, if one hundred $1 bets are made on a gaming device in which the RTP is 90%, on average, approximately $90 will be awarded in payouts.

The terms "controller" and "computer" shall be synonymous and may refer to an electronic device (e.g., a personal computer) that communicates with one or more other gaming devices. A controller may function as a computer server and may control some or all operations or actions of the gaming devices, or actions or operations associated with or related to such gaming device(s). A controller may also include one or more databases to record statistics such as coin-in, coin-out, jackpot information, theoretical wins, and the like.

The term "game controller" may refer to a circuit (e.g., an electronic circuit board, a programmable computer chip, an integrated circuit ("IC"), etc.) within a gaming device that includes one or more processors that process game play instructions in accordance with game play rules, and outputs or generates game play outcomes to one or more displays, screens, or monitors. For example, a game controller can process game play instructions, and generate outcomes, as described in Section III. The game play rules may be stored as program code in a memory (for execution by one or more processors of the game controller) but can also be hardwired in a dedicated circuit. In some embodiments, the memory may also store data indicative of a plurality of symbols, pay tables, reel strip layouts, images, and/or other information to be used in games.

The term "processor" when described as part of, or existing within a game controller, may refer generically to any device that can process game play instructions in accordance with game play rules and may include: a microprocessor, microcontroller, programmable logic device, digital signal processors, graphics processors, and/or other computational device, a general-purpose computer (e.g., a PC) or a server. That is, a processor may be provided by any suitable logic circuitry for receiving inputs, processing the inputs in accordance with instructions stored in memory and generating outputs (for example, on the display). For example, a processor can process game play instructions, and generate outcomes, as described in Section III. Such processors may also be referred to as central processing units ("CPUs"). Most processors are general-purpose units, however, it is also known to provide a specific-purpose processor using, for example, an application-specific integrated circuit ("ASIC") or a field-programmable gate array ("FPGA"). Exemplary processors include the INTEL® PENTIUM® and the AMD® ATHLON® processors.

The term "control logic" may refer to a game controller or, more generally, one or more processors, operable to process game play instructions in accordance with game play rules, determine outcomes in accordance with game play rules, and generate outputs (e.g., to one or more display screens and/or speakers). For example, control logic can implement game play instructions, determine outcomes, and generate outputs as described in Section III. Depending on implementation, control logic can be implemented by software executable on a CPU, by software controlling special-purpose hardware (e.g., a GPU or other graphics hardware for video acceleration), or by special-purpose hardware (e.g., in an ASIC).

The term "application" or "program" may refer to software such as an operating system, device drivers, and/or appropriate user-mode instructions to provide functionality. The software can be stored in an associated memory device (example of a computer-readable medium). The software may be, for example, firmware. While it is contemplated that an appropriately programmed general-purpose computer or computing device may be used to execute such software, it is also contemplated that hard-wired circuitry or custom hardware (e.g., an ASIC) may be used in place of, or in combination with, software instructions for implementation of the processes of various embodiments. Thus, embodiments are not limited to any specific combination of hardware and software.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include dynamic random access memory ("DRAM"), which typically constitutes main memory. Statutory types of transmission media include coaxial cables, copper wire and fiber optics, including the wires that comprise a system bus coupled to the processor. Common forms of computer-readable media include, for example, a solid state drive, a flash drive, a secure digital ("SD") card, a compact flash ("CF") card, a floppy disk, a flexible disk, hard disk, magnetic tape, any other magnetic medium, a CD-ROM, Digital Versatile Disc ("DVD"), any other optical medium, punch cards, paper tape, any other physical medium with patterns of holes, RAM, programmable read-only memory ("PROM"), erasable programmable read-only memory ("EPROM"), FLASH-EEPROM, a USB memory stick, a dongle, any other memory chip or cartridge, or any other medium from which a computer can read. The terms "computer-readable memory" and/or "tangible media" specifically exclude signals, waves, and wave forms or other intangible or transitory media that may nevertheless be readable by a computer. The term "carrier wave" may refer to an electromagnetic wave modulated in amplitude or frequency to convey a signal. Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols.

The term "product" means any machine, manufacture and/or composition of matter as contemplated by 35 U.S.C. § 101, unless expressly specified otherwise.

The term "peripheral device" may refer to a device operatively connected (e.g., physically, wirelessly, and/or logically) to a gaming device (e.g., more specifically to a game controller within a gaming device) that is configured to assist in the operation of game, play, payout, wager and/or player tracking related functions. In some embodiments peripheral devices may be located near players at a table game.

The term "display," "screen," or "display screen" may refer to an area that conveys information to a viewer. The information may be dynamic, in which case, the display screen may use liquid crystal display ("LCD") technology, light-emitting diode ("LED") technology, cathode ray tube ("CRT") technology, digital light processing ("DLP") technology, rear projection technology, front projection technology, or some other display technology. The term "primary game screen," "main display" or "main display screen" may refer to a display screen or an area of a display screen used to display game information related to a primary game such as a video representation of one or more spinning reels. The term "secondary game screen" or "bonus display" may refer to a display screen or an area of a display screen used to display secondary game information such as animations and other graphics associated with a bonus game.

The term "slot machine" may refer to a gaming device or any mechanical, electrical or other device, contrivance or machine which, upon insertion of any monetary value in the form of a bill, a coin, ticket, token or similar object, or upon payment via electronic funds transfer ("EFT"), a mobile device, and/or a wireless device, or upon payment of any consideration, is available to play or operate, the play or operation of which, whether by reason of the skill of the operator in playing a gambling game which is presented for play by the machine or application of the element of chance, or both, may deliver or entitle the person playing or operating the machine to receive cash, premiums, merchandise, tokens, tickets, or anything of value, whether the payoff is made automatically from the machine or in any other manner.

The term “network” may refer to an energy delivery network or information network through which one or more computing devices may communicate with one another. Such devices may communicate directly or indirectly, via a wired or wireless medium such as the Internet, a local area network (“LAN”), wide area network (“WAN”) or Ethernet (or IEEE 802.3), Token Ring, or via any appropriate communications means or combination of communications means. Exemplary communication protocols include but are not limited to: Bluetooth™, Time Division Multiple Access (“TDMA”), Code Division Multiple Access (“CDMA”), Global System for Mobile communications (“GSM”), Enhanced Data rates for GSM Evolution (“EDGE”), General Packet Radio Service (“GPRS”), Wideband CDMA (“WCDMA”), Advanced Mobile Phone System (“AMPS”), Digital AMPS (“D-AMPS”), IEEE 802.11 (“WI-FI”), IEEE 802.3, the best of breed (“BOB”), system to system (“S2S”), or the like. If video signals or large files are being sent over the network, a broadband network may be used to alleviate delays associated with the transfer of such large files, however, such is not strictly required. Each of the devices can be adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

II. Example Electronic Gaming Servers and Electronic Gaming Machines

An example embodiment of the system 100 of the present invention is depicted in FIG. 1. The present invention can be configured to work as an electronic gaming system 100 in a network environment including one or more server computers 102 (e.g., slot servers of a casino) that are in communication, via a communications network, with one or more gaming devices 104A-X that have communication interfaces with the network. Server computers 102 may include, for example, a slot server in a casino, configured to communicate with gaming devices 104A-X, which may be configured as EGMs such as slot machines, video poker machines, etc. Server computers 102 may communicate with the gaming devices directly or indirectly, via a wired or wireless medium such as the Internet, Wi-Fi, Ethernet, other LAN or WAN protocols, or via any appropriate communications means or combination of communications means. Higher level communications protocols may be used to facilitate communications between server computers 102 and gaming devices 104A-X. Each of the gaming devices 104A-X may be an EGM that is configured to communicate with the server computers 102. Any number and type of gaming devices 104A-X may be in communication with the server computers 102.

Communication between the gaming devices 104A-X and the server computers 102, and among the gaming devices 104A-X, may be direct or indirect, such as over the Internet through a website maintained by computer on a remote server or over an online data network including commercial online service providers, Internet service providers, private networks, and the like. In yet other embodiments, the gaming devices 104A-X may communicate with one another and/or the server computers 102 over RF, cable TV, satellite links and the like.

Some, but not all, possible communication networks that may comprise the network or be otherwise part of the system 100 include: a LAN, a WAN, the Internet, a telephone line, a cable line, a radio channel, an optical communications line, and a satellite communications link. Example communications protocols that may be part of the system include: Ethernet (or IEEE 802.3), Session Announcement Protocol (“SAP”), Autonomous Transport Protocol (“ATP”), Bluetooth™, and Transmission Control Protocol/Internet Protocol (“TCP/IP”). In addition, session, presentation, and application layer protocols may also be employed. Communication may be encrypted to ensure privacy, provide security, and prevent fraud in any of a variety of ways well known in the art.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for days or weeks at a time.

In some embodiments, server computers 102 may not be necessary and/or preferred. For example, the present invention may, in one or more embodiments, be practiced on a stand-alone gaming device such as gaming device 104A and/or a gaming device 104A in communication only with one or more other gaming devices 104B-X (i.e., without server computers 102). In such embodiments, any functions described as performed by the server computers 102 or data described as stored on the server computers 102 may instead be performed by or stored on one or more gaming devices 104A-X.

II.A. Example Server Computers

As discussed above, server computers 102 can include one or more servers that combine to form a casino management system, which manages one or more gaming devices 104A-X. Each of the servers includes at least one processor, memory, and a network interface, which enables communication over one or more networks between the server computers 102 and the gaming devices 104A-X. In general, the casino management system is configured to receive gaming data from the gaming devices 104A-X as the gaming devices 104A-X conduct rounds of play of one or more wagering games.

In some embodiments, the servers may be embodied as conventional slot servers that provide various gaming device monitoring and management functions. Examples of such systems are described in U.S. patent application Ser. No. 11/225,407, by Wolf et al., entitled “METHODS AND DEVICES FOR MANAGING GAMING NETWORKS" and filed Sep. 12, 2005, the disclosure of which is hereby incorporated by reference.

In other embodiments, the server computers 102 can include a central determination gaming system server 106, which may be called a gaming server. A central determination gaming system server 106 can be implemented as described in U.S. Pat. No. 8,932,129 by Powell et al., the disclosure of which is hereby incorporated by reference. Or, the central determination gaming system server 106 can have an architecture similar to one of the gaming devices 104A-X, as described with reference to FIG. 2. The central determination gaming system server 106 can perform multiple functions, such as game outcome generation.

Gaming devices 104A-X can include features to enable operation of the central determination gaming system server 106 for use by the player and operator (e.g., the casino). In such systems, a game outcome may be generated on the central determination gaming system 106, which is typically a host computer server. The game outcome is then transmitted over the network to any of a group of remote terminals or remote gaming devices 104A-X that utilize the game outcome and display the result to the player. The remote gaming devices 104A-X are connected to the central determination gaming system 106 via a network such as a LAN, a WAN, an intranet or the Internet. The remote gaming devices 104A-X may be portable gaming devices such as, but not limited to, a smartphone, a tablet, a laptop, a cell phone, a personal digital assistant, a personal computer, and a wireless game player. In some embodiments, images rendered from 3D gaming environments may be displayed on portable gaming devices that are used to play the game. Further the gaming devices 104A-X or the central determination gaming system 106 may include gaming logic (example of control logic) for commanding a remote gaming device to render an image from a virtual camera in 3D gaming environments stored on the remote gaming devices 104A-X and to display the rendered image on a display located on the remote gaming devices 104A-X. Thus, those of skill in the art will understand that embodiments of the present invention, as described below, can be deployed on most any gaming device currently available or hereafter developed.

The server computers 102 can also include a ticket-in-ticket-out ("TITO") system server 108 or accounting server. A TITO system server 108 can be implemented as described in U.S. Pat. No. 6,048,269 by Burns et al., the disclosure of which is hereby incorporated by reference. Gaming devices 104A-X can include features to enable operation of the TITO system server 108 for use by the player and operator (e.g., the casino).

The server computers 102 can also include a player tracking system server 110. A player tracking system server 110 can be implemented as described in U.S. Pat. No. 6,142,876 by Cumbers, the disclosure of which is hereby incorporated by reference. Gaming devices 104A-X can include features to enable operation of the player tracking system server 110 for use by the player and operator (e.g., the casino). The player tracking system server 110 can perform various functions. For example, the player tracking system server 110 may track data of players using the gaming devices 104A-X. The player tracking system server 110 can store physical characteristics of players, such as gender and age. The player tracking system server 110 can also track and store other data related to the players using player tracking identification, such as a player card. For example, the player tracking system server 110 can store information about a player such as loyalty points, player address, phone number, and/or any information that may be retrieved and transmitted to the gaming devices 104A-X.

The server computers 102 can also include a progressive system server 112 or bonus server. A progressive system server 112 can be implemented as described in U.S. Patent Publication No. US 2006/0287077 by Gray et al., the disclosure of which is hereby incorporated by reference. Gaming devices 104A-X can include features to enable operation of the progressive system server 112 for use by the player and operator (e.g., the casino).

The server computers 102 can also include a casino management system server 114. A casino management system server 114 can be implemented as described in PCT Patent Publication No. WO 2005/02609A2 by Frerking et al., the disclosure of which is hereby incorporated by reference. Gaming devices 104A-X can include features to enable operation of the casino management system server 114 for use by the operator (e.g., the casino). The server computers 102 can also include a configuration workstation (not shown), which is coupled to the gaming devices 104A-X through the network.

FIG. 1 shows different servers that perform different sets of functions. Alternatively, one or more of the different servers shown in FIG. 1 can be combined.

II.B. Example Gaming Devices

Still referring to FIG. 1, the gaming devices 104A-C illustrated are specific exemplary embodiments of EGMs suitable for use with embodiments of the present invention, and the same or similar elements shown in gaming devices 104A-C may be included in any gaming device 104X, which is also suitable for use with embodiments of the present invention. More generally, an EGM may be any type of gaming machine and may include, without limitation, different structures than those shown in FIG. 1. For example, an EGM can be implemented using a personal computer, tablet computer, smartphone, personal digital assistant, or any other network-enabled device.

Details of an example gaming device 104A are now described in detail. The particular example gaming device 104A pictured in FIG. 1 is a Relm XL™ model gaming device manufactured by Aristocrat® Technologies, Inc. Gaming device 104A may include a main cabinet 116, which generally surrounds the device's interior (not shown) and is viewable by players. The main cabinet 116 provides a support structure for the example gaming device 104A and housing for components of the example gaming device 104A. The main cabinet 116 can include a main door 118 on the front of the gaming device 104A, which opens to provide access to the interior of the gaming device 104A. Main cabinet 116 typically includes a button area or button deck 120 accessible by a player that is configured with input switches or buttons 122, a bill validator 124 for accepting and/or validating cash bills, coupons, and/or ticket vouchers, a ticket-out printer 126 and a coin tray (not present in the example embodiment shown in FIG. 1). In some embodiments, a coin-in slot may also be provided for accepting coins and/or tokens.

The input switches or buttons 122, along with other input devices, provide at least part of a player interface through which a player controls operation of a game. For example, buttons 122 may be used to start play of a primary game or secondary game. One button may be a "Bet One" button that enables the player to place a bet or to increase a bet. Another button may be a "Bet Max" button that enables the player to bet a maximum permitted wager. Yet another button may be a "Cash Out" button that enables the player to receive a cash payment or other suitable form of payment, such as a ticket or voucher that corresponds to a number of remaining credits. Alternatively, instead of having separate buttons that can be actuated physically, one or more of the buttons 122 can be presented on a touch screen.

The main cabinet provides structural support for the main display 128. In many configurations, a main display 128 (e.g., video display monitor) is mounted to, or above, the main door 118. The main display 128 can be a high-resolution LCD, plasma, LED, OLED, or SED panel, which may be flat or curved as shown, a cathode ray tube, or other conventional electronically-controlled video monitor. Alternatively, the main display 128 can be a touch screen display. Bill validator 124, player-input buttons 122 and main display 128 are interface components used to play a game on the gaming device 104A.

In some embodiments, the bill validator 124 may also function as a "ticket-in" reader that allows the player to use a casino-issued credit ticket to load credit onto the gaming device 104A (e.g., in a cashless ticket (TITO) system). In such cashless embodiments, the gaming device 104A may also include a "ticket-out" printer 126 for outputting a credit ticket when a "cash out" button is pressed. Cashless ticket systems can be used to generate and track unique bar-codes that are printed on tickets to allow players to avoid the use of bills and coins for loading credits, instead using a ticket reader and cashing out credits through the use of ticket-out printer 126 on the gaming device 104A. Alternatively, the gaming device 104A can include some other type of credit input device. For example, the gaming device 104A can include a card reader or validator for use with credit cards, debit cards, identification cards, and/or smart cards. Cards accepted by the card reader or validator may include a magnetic strip and/or a preprogrammed microchip that includes a player's identification, credit totals, and any other relevant information that may be used. The credit input device may include a credit input module that interfaces with a server to accept credit and wagers.

In some embodiments, a player tracking card reader 144, a transceiver for wireless communication with a player's smartphone, a keypad 146, and/or an illuminated display 148 for reading, receiving, entering, and/or displaying player tracking information can be provided. In such embodiments, a game controller within the gaming device 104A can communicate with the player tracking server system 110 to send and receive player tracking information.

Figure 2:
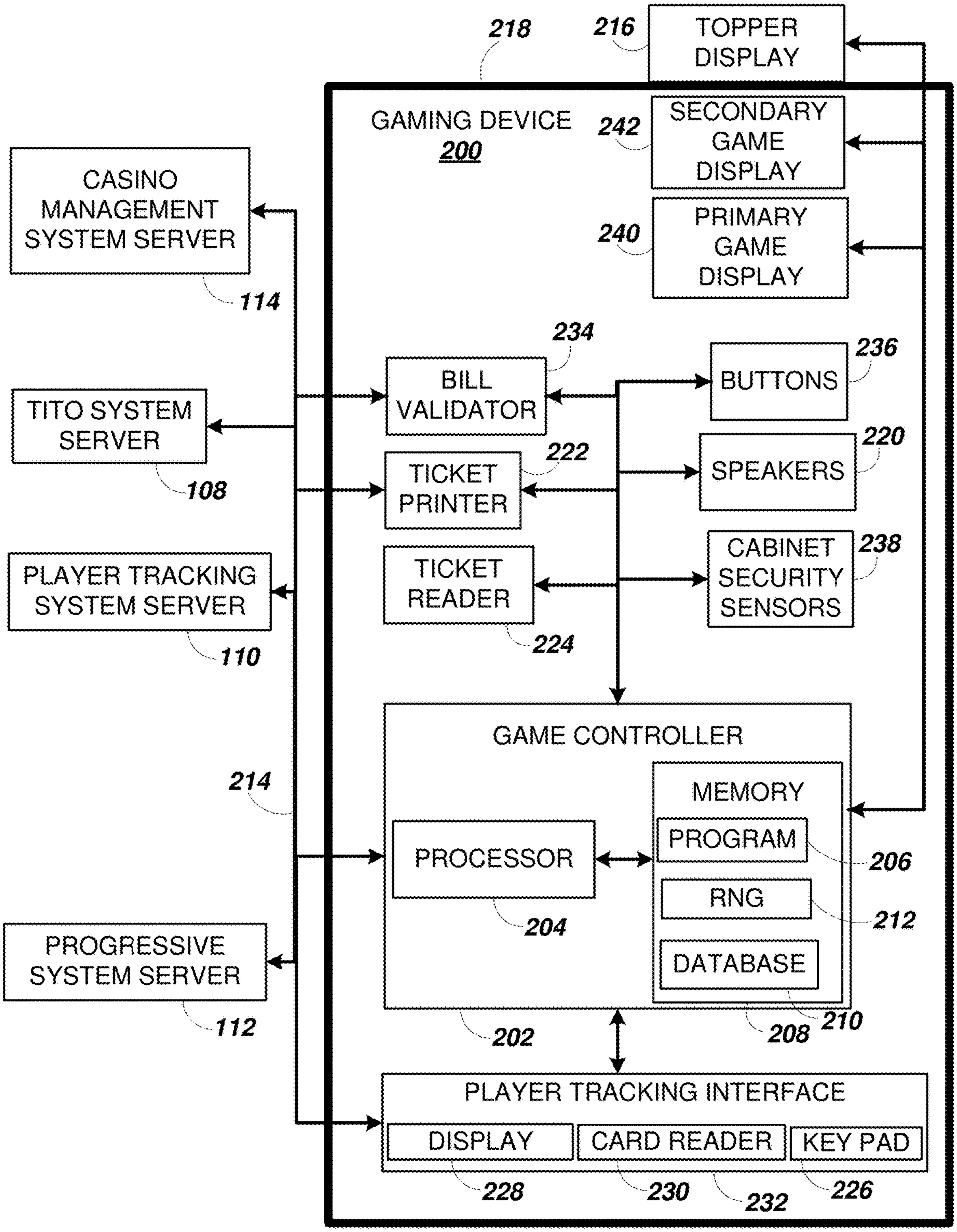
FIG. 2 is a block diagram illustrating an example of a networked EGM according to some embodiments.

Gaming device 104A may also include physical spinning reels 130 and a handle 132 that is typically mounted to the side of main cabinet 116 and may be used to initiate game play. Many or all of the above described components can be controlled by circuitry (e.g., a game controller) housed inside the main cabinet 116 of the gaming device 104A, the details of which are shown in FIG. 2.

In the example gaming device 104A configuration shown in FIG. 1, a bonus topper wheel 134 is included. When bonus play is triggered (e.g., by a player achieving a particular outcome or set of outcomes in the primary game), bonus topper wheel 134 is operative to spin and stop with indicator arrow 136 indicating the outcome of the bonus wheel game. Bonus topper wheel 134 is typically used to play a bonus game, but it could also be incorporated into play of the base or primary game. A candle 138 may be mounted on the top of gaming device 104A and may be activated by a player (e.g., using a switch or one of buttons 122) to indicate to operations staff that gaming device 104A has experienced a malfunction or the player requires service.

An information panel 152 may be a back-lit, silkscreened glass panel with lettering to indicate general game information including, for example, a game denomination (e.g., $0.25 or $1). In some embodiments, the information panel 152 may be implemented as an additional display screen.

Note that not all gaming devices suitable for implementing embodiments of the present invention necessarily include top wheels, top boxes, information panels, cashless ticket systems, and/or player tracking systems. Further, some suitable gaming devices have only a single game display that includes only a set of reels and/or a display screen, while others are designed for bar tables or table tops and have displays that face upwards. The example gaming device 104A can be positioned on a base or stand. While the example gaming devices 104A-C shown in FIG. 1 are configured for operation by a sitting player in front the gaming device, an EGM can instead be configured for operation by a sitting player at a table or a standing player.

An alternative example embodiment of a gaming device 104B is also illustrated in FIG. 1. The particular example depicted is the Arc™ model gaming device manufactured by Aristocrat® Technologies, Inc. Where possible, reference numerals identifying similar features of the gaming device 104A embodiment are used to identify corresponding features of the gaming device 104B.

Example gaming device 104B may include a main cabinet 116 including a main door 118, which opens to provide access to the interior of the gaming device 104B. The main cabinet 116 includes a button deck 120 with buttons 122, a bill validator 124, and a ticket-out printer 126. A main display 128 (e.g., display screen monitor) is mounted to, on, or above, the main door 118. The main display 128 can be a high-resolution LCD, plasma, LED, OLED, or SED panel, which may be in a portrait orientation with curvature radius from top to bottom as shown. Alternatively, the main display 128 can be a touchscreen display. The bill validator 124 may also function as a "ticket-in" reader for cashless play. A player tracking card reader 144, a transceiver for wireless communication with a player's smartphone, a keypad 146, and/or an illuminated display 148 for reading, receiving, entering, and/or displaying player tracking information is also provided.

Note that gaming device 104B does not include physical reels and instead shows game play functions on main display 128. An optional topper screen 140 may be used as a secondary game display for bonus play, to show game features or attraction activities while the game is not in play, or to show any other information or media desired by the game designer or operator. In some embodiments, topper screen 140 may also or alternatively be used to display progressive jackpot prizes available to a player during play of gaming device 104B.

Another alternative example embodiment of a gaming device 104C is also shown in FIG. 1. The pictured embodiment is a Helix™ model gaming device manufactured by Aristocrat® Technologies, Inc. Where possible, reference numerals identifying similar features of the embodiments of gaming devices 104A and 104B are used to identify corresponding features of gaming device 104C.

Example gaming device 104C may include a main cabinet 116 including a main door 118, which opens to provide access to the interior of the gaming device 104C. The main cabinet 116 includes a button deck 120 with buttons 122, a bill validator 124, and a ticket-out printer 126. A main display 128A (e.g., display screen monitor) is mounted to, on, or above, the main door 118. The main display 128A can be a high-resolution LCD, plasma, LED, OLED, or SED panel, which may be in a landscape orientation with curvature radius from top to bottom. Alternatively, the main display 128A can be a touchscreen display. The bill validator 124 may also function as a "ticket-in" reader for cashless play. The gaming device 104C includes a sound system (e.g., speakers 142) for playing game sound effects and music to enhance the player's game play experience. A player tracking card reader 144 and/or a transceiver for wireless communication with a player's smartphone for reading and/or receiving player tracking information is also provided.

Note that gaming device 104C includes a main display 128A that is in a landscape orientation. Although not illustrated by the front view provided, the landscape display 128A has a curvature radius from top to bottom. In some embodiments, display 128A can be a flat panel display. Gaming device 104C does not include physical reels and instead shows game play functions on main display 128A and a secondary display 128B. The secondary display 128B can be a high-resolution LCD, plasma, LED, OLED, or SED panel, which may be in a landscape orientation with curvature radius from top to bottom, or may be flat. A mounting bezel can divide the main display 128A from the secondary display 128B. Main display 128A is typically used for primary game play while secondary display 128B is typically used for bonus game play, to show game features or attraction activities while the game is not in play, or to show any other information or media desired by the game designer or operator.

The example gaming devices 104A-C shown in FIG. 1 show three different configurations of display screens. In general, a gaming device includes a main display 128, 128A. In many configurations, a gaming device also includes a secondary display 128B above, below, or to one side of the main display 128, 128A. A gaming device may include one or more other display screens, in addition to the main display 128, 128A and secondary display 128B, for displaying a secondary or bonus game, credit balances, wager amounts, cumulative wagering information, payout amounts, RTP information, casino-wide information, player points, or comp data. Such additional display screens may be of any suitable size and configuration (e.g., circular or rectangular) and may further include a haptic feedback mechanism.

Typically, the main display 128, 128A displays a wagering game and/or accepts game play data from a player. The main display 128, 128A may also display information relating to an interactive game, a wager-triggering event, or a wagering outcome. The secondary display 128B may, for example, display digital signage such as advertisements for one or more games or other aspects of the gaming establishment or casino. The secondary display 128B may be further configured to display wagering outcomes, secondary game data associated with or unassociated with the interactive wagering game displayed on main display 128, 128A, and any information relating to such interactive wagering games. The secondary display 128B may be further configured to receive inputs and commands from the player. In some configurations, the secondary display 128B includes a credit or fund display that displays the player's current credit balance, cash accumulated, account balance, an original number of credits input to the gaming device, or any other credit- or wager-related information. The secondary display 128B can also display a wager amount for a current round of play. The secondary display 128B may be further configured to display the player's winnings and bonus awards for the current round of play, as well as accumulated winnings and/or bonus awards.

For a game, the main display 128, 128A is configured to display at least one game or game image, game symbol or symbols, and other game indicia such as visual representations or exhibitions of movement of objects. Depending on the game, the main display 128, 128A may display, for example, virtual, or video, reels and wheels, dynamic lighting, video images, images of people, characters, places, things, and faces of cards. The symbols, images, and indicia are displayed electronically, or virtually, on the main display 128, 128A. Alternatively, symbols, images, and indicia can be displayed mechanically on one or more reels. Such mechanical reels can be part of an electromechanical device, and may provide one or more rotatable or spinning wheels, reels, or dice, any of which may be configurable to display one or more games, images, symbols, or indicia.

Many different types of games, including mechanical slot games, video slot games, video poker, video black jack, video pachinko, keno, bingo, and lottery, may be provided with or implemented within the depicted gaming devices 104A-C and other gaming devices. In particular, a gaming device may be operable to provide play of many different instances of games of chance. The instances may be differentiated according to themes, sounds, graphics, type of game (e.g., slot game vs. card game vs. game with aspects of skill), denomination, number of pay lines, maximum jackpot, progressive or non-progressive, bonus games, Class 2 or Class 3, etc.

A gaming device suitable for implementing the present invention may be operable to allow a player to select a game of chance, skill, or combination thereof, to play from a plurality of instances available on the gaming device. For example, a gaming device may provide a menu with a list of the instances of games that are available for play on the gaming device, and a player may be able to select from the list a first instance of a game that they wish to play.

II.C. Example Components of Gaming Device

Turning now to FIG. 2, a block diagram depicting an example of the components of a gaming device 200 connected to external systems is shown. All or parts of the example gaming device 200 shown could be used to implement any one of the example gaming devices 104A-X depicted in FIG. 1.

One or more instances of wagering games available for play on the gaming device 200 are controlled by a game controller 202. In general, the game controller 202 conducts a wagering game, generates gaming data (e.g., for wagers, game outcomes, payouts, player ratings, duration of play, and time between rounds of play), and, for each round of play of the wagering game, awards a payout or win amount according to a pay table. A base game can include a bonus game that the game controller 202 also conducts. More generally, the game controller 202 can process game play instructions and generate outcomes as described in Section III.

The game controller 202 includes one or more processors 204 as well as a game that may be stored as a program 206 (software) in memory 208 coupled to the processor 204. The processor 204 may be programmed by encoding an operation as one or more executable instructions and providing the executable instructions in the memory 208. The processor 204 may be, for example, a microprocessor, a microcontroller-based platform, a suitable integrated circuit, and/or one or more ASICS.

The memory 208 may include one or more mass storage devices or media that are housed within gaming device 200. Alternatively, data and computer-executable instructions may be stored in a cloud service, a database, or other non-transitory memory accessible by the gaming device 200. This can reduce the computational and storage burden on the gaming device 200. As such, memory 208 may be a local and/or a remote computer storage media including memory storage devices. Moreover, memory 208 may include one or more forms of memory. For example, memory 208 can include RAM, ROM, flash memory, and/or EEPROM. Other suitable magnetic, optical, and/or semi-conductor-based memory may be included in memory 208 by itself or in combination. Within the mass storage devices and/or memory 208, one or more databases 210 may be provided for use by the program 206. As part of the memory 208, the game controller 202 can track and record gaming data in a meter (e.g., amounts wagered at the gaming device 200)). In some example implementations, the memory 208 is a physical storage device, such as a cartridge that is removable from the gaming device 200. The memory 208 can include multiple removable physical storage devices, each configured to store certain executable program modules. Alternatively, the memory 208 includes multiple partitions of a single physical storage device, each partition configured to store certain executable program modules.

A random number generator ("RNG") 212 can be implemented in hardware and/or software. The RNG 212 can be integrated into the game controller 202 or processor 204. The RNG 212 is configured to be secure from unauthorized access, manipulation, or compromise. Generally, an output of the RNG 212 is the basis on which game outcomes are determined by the game controller 202. The output of the RNG 212 can include a random number or pseudo random number (either is generally referred to as a "random number").

The RNG 212 is typically used to generate random numbers that are used in the operation of game play to ensure that game play outcomes are random and meet regulations for a game of chance. Alternatively, a game instance may be generated on a remote gaming device such as a central determination gaming system server 106 (not shown in FIG. 2, but see FIG. 1). Output for the game instance is communicated to gaming device 200 via the network 214 and then displayed on gaming device 200. Gaming device 200 may execute game software, such as but not limited to video streaming software that allows the game to be displayed on gaming device 200. When an instance of a game is stored on gaming device 200, it may be loaded from memory 208 (e.g., from a ROM) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.), which sits on top of main cabinet 218. In addition to the components described above, either gaming cabinet 218 or topper display 216 may also house a number of other components which may be used to add features to a game being played on gaming device 200, including speakers 220, a ticket printer 222 that prints bar-coded tickets, and a ticket reader 224 that reads bar-coded tickets. Ticket printer 222 may be used to print tickets for a TITO system server 108. As indicated above with respect to the gaming devices 104A-104X of FIG. 1, the gaming device 200 can further include a bill validator 234, coin acceptor, ticket reader 224, card reader, or other credit input device. The credit input device can include an interface to a server, which is configured to accept credits to establish a credit balance at the gaming device 200. The gaming device includes buttons 236 for player input, as well as cabinet security sensors 238 to detect unauthorized opening of the cabinet 218. For player tracking, the gaming device 200 can include a keypad 226 for entering player tracking information, a player tracking display 228 for displaying player tracking information (e.g., an illuminated or display screen), and a card reader 230 for receiving data and/or communicating information to and from media or a device such as a smartphone. Some or all of these components collectively may be referred to as a player tracking interface 232.

The gaming device 200 includes several display screens, each coupled to and operable under the control of the game controller 202. A primary game display 240 acts as a main display 128, 128A as described with reference to FIG. 1. A secondary game display 242 acts as a secondary display 128B as described with reference to FIG. 1. The gaming device 200 can include a credit display that displays a player's current number of credits, cash, account balance, or the equivalent. The gaming device 200 can also include a bet display that displays a player's amount wagered. The credit display and/or bet display may be standalone displays, independent of the primary game display 240 and secondary game display 242. Alternatively, the credit display and/or bet display can be incorporated into the primary game display 240 or secondary game display 242. Any of the display screens can be implemented as a touch screen, with an associated touch screen controller. In this case, such display screens may be operated as input devices in addition to presenting information, to provide input game play decisions (e.g., actions on and selection of game presentation objects).

The game controller 202 can communicate over a network with one or more other gaming devices or other devices via a communication interface. The communication interface may operate as an input device (e.g., by receiving data from another device) and/or as an output device (e.g., by transmitting data to another device). The gaming device 200 can also include one or more communication ports that enable the game controller 202 to communicate with peripheral devices, external video sources, expansion buses, or display screens.

Gaming device 200 may be connected over the network 214 to a player tracking system server 110. Player tracking system server 110 may be, for example, an OASIS® system manufactured by Aristocrat® Technologies, Inc. Player tracking system server 110 is used to track play for individual players so that an operator may reward players in a loyalty program. A player uses the player tracking interface 232 that includes player tracking keypad 226, player tracking display 228 and card reader 230, which is typically housed within cabinet 218. Details of example player tracking systems can be found in Patent Pub. No. US 2009/0054139 A1, the disclosure of which is hereby incorporated by reference.

When games are implemented in an online environment, at least a portion of the game software can be stored in a remote game server or in a cloud computing service. Game transactions such as adding money to the game (i.e., cash in) and withdrawing money from the game (i.e., cash out) are substituted by implementing electronic fund transfers. A player deposits money into his online gaming account via checks, debit cards, wire and the like. Once funded, the player can move a portion of the cash in his account into the game he wants to play. This process is referred to as account-based wagering. Account-based wagering is a convenient monetary transaction system for online and mobile wagering environments since the physical bill acceptor and ticket printer are not available. In addition to the accounting meters' separation, the detection of the location where the wagering transaction take place is also performed in order to enforce local gaming regulations and properly calculate revenue, profit, and tax withholdings, for example. Thus, a remote gaming device can access a casino via a computer network and participate in a game of chance. The remote gaming device may be a PC, smartphone, or other computing device coupled to the Internet via a wired or wireless link (and, e.g., connecting to a casino management system via a virtual private network). The remote gaming device may be a terminal-based machine, where the actual game (including RNG and outcome determination) is hosted at a gaming server, with the terminal-based machine displaying results of the game via one or more display screens.

Returning now to the example of FIG. 2, when a user wishes to play the gaming device 200, he can insert cash through a coin acceptor (not shown) or bill validator 234. Alternatively, bill validator may include ticket reader 224, enabling the acceptance of a printed ticket voucher, which may be accepted as an indicia of credit when a cashless TITO system server 108 is used. At the start of the game, the player may enter playing tracking information using card reader 230, keypad 226, and the display 228. Further, other game preferences of the player playing the game may be read from a card inserted into the card reader 230. During the game, the player views game information using game displays 240, 242. Other game and prize information may also be displayed on topper display 216.

During the course of a game, a player may be required to make a number of decisions, which affect the outcome of the game. For example, a player may vary his or her wager on a particular base reel game (which affects the bet level and hence the likelihood of special symbol stacks, the likelihood of triggering the bonus reel game, the likelihood of reaching higher award amounts of the progressive jackpot, etc.), select a prize for a particular game selected from a prize server, or make game decisions which affect the outcome of a particular game. The player may make these choices using the player-input buttons 236, the primary game display 240 which may be a touch screen, or using some other device which enables a player to input information into the gaming device 200. In some embodiments, the player may be able to access various game services such as concierge services and entertainment content services using the primary game display 240 and one or more input devices.

During certain game events, the gaming device 200 may display visual and auditory effects that can be perceived by the player. These effects add to the excitement of a game, which makes a player more likely to continue playing. Auditory effects include various sounds that are projected by the speakers 220. Visual effects include flashing lights, strobing lights or other patterns displayed from lights on the gaming device 200 or from lights behind the information panel 152 (FIG. 1). After the player has completed a game, the player may receive game credits, game tokens from the coin tray (not shown), or a ticket from ticket printer 222, which may be used for further games or to redeem a prize. Further, the player may receive a ticket for food, merchandise, or games from the ticket printer 222.

Those of skill in the art will appreciate that embodiments of the present invention could be implemented with more or fewer elements than are depicted in FIG. 2. For example, player tracking system server 110 is not a necessary feature of some implementations of the present invention. However, player tracking programs may help to sustain a game player's interest in additional game play during a visit to a gaming establishment and may entice a player to visit a gaming establishment to partake in various gaming activities. Player tracking programs provide rewards to players that typically correspond to the player's level of patronage (e.g., to the player's playing frequency and/or total amount of game plays at a given casino). Player tracking rewards may be free meals, free lodging and/or free entertainment. Player tracking information may be combined with other information that is now readily obtainable by a casino management system.

Note that the pictured example embodiments of a gaming device 200, as well as example gaming devices 104A-C, are merely a few examples from a wide range of possible gaming device designs on which embodiments of the present invention may be implemented. Depending on implementation and the type of processing desired, components of the gaming device 200 can be added, omitted, split into multiple components, combined with other components, and/or replaced with like components. In alternative embodiments, gaming devices with different components and/or other configurations of components perform one or more of the described techniques. Specific embodiments of gaming devices typically use a variation or supplemented version of the gaming device 200. The relationships shown between components within the gaming device 200 indicate general flows of information in the gaming device 200; other relationships are not shown for the sake of simplicity. In general, the game controller 202 can be implemented by software executable on a CPU, by software controlling special-purpose hardware, or by special-purpose hardware (e.g., in an ASIC).

II.D. Specialized Features of Example Gaming Devices and Servers

Gaming devices such as gaming device 200 (as a generalized example of devices 104A-X) typically include special features and/or additional circuitry that differentiates them from general-purpose computers (e.g., desktop computers and laptops). Gaming devices such as gaming device 200 are highly regulated to ensure fairness and, in many cases, are operable to dispense monetary awards (e.g., in the form of a redeemable voucher) of multiple millions of dollars. Therefore, to satisfy security and regulatory requirements in a gaming environment, hardware and software architectures are implemented in gaming devices that differ significantly from those of general-purpose computers. A description of gaming devices relative to general-purpose computing machines and some examples of the additional (or different) components and features found in gaming devices are described below.

Ostensibly, it may superficially seem that adapting general-purpose computers to gaming industry applications (i.e., as gaming devices) would be a relatively straightforward proposition because both general-purpose computers and gaming devices 200 use processors coupled to a memory to execute stored instructions to receive input, display output, and to control a variety of peripheral devices. However, because of 1) the regulatory requirements for gaming devices 200, 2) the harsh environment in which gaming devices 200 operate, 3) security requirements, and 4) fault tolerance requirements, adapting general-purpose computers to function as gaming devices 200 is not simple or straightforward, requires substantial engineering effort, and requires additional hardware not typically found in general-purpose computers. Further, techniques and methods for solving a problem in the PC industry, such as device compatibility and connectivity issues, are typically not adequate in the gaming environment. For instance, a fault or a weakness tolerated in a PC, such as security holes in software or relatively frequent crashes, may not be tolerated in a gaming device 200 because in a gaming device 200 these faults can lead to a direct loss of funds from the gaming device 200, such as stolen cash or loss of revenue when the gaming device 200 is not operating properly.

To illustrate that gaming devices 200 are specially-configured gaming hardware and not merely general-purpose computers, a few examples of the specialized hardware configuration, as well as differences between PC systems and gaming devices 200, are provided. A first difference between a gaming device 200 and common processor-based computer system is that gaming device 200 is designed to be a state-based system. In a state-based system, the system stores and maintains its current state in a non-volatile memory, such that, in the event of a power failure or other malfunction, the gaming device 200 will return to its current state when the power is restored. For instance, if a player was shown an award for a game of chance and, before the award could be provided to the player, the power failed, the gaming device 200, upon the restoration of power, would return to the state where the award is indicated. In contrast, PCs are not state machines to the same extent, and a majority of data is usually lost when a malfunction occurs. This requirement affects the software and hardware design on a gaming device 200.

A second significant difference between gaming devices 200 and common PC-based computer systems is that, for gaming regulation purposes, the software on the gaming device 200 used to generate the game of chance and operate the gaming device 200 has been designed to be static and monolithic (i.e., immutable) to prevent cheating by the user of gaming device 200. For instance, one solution that has been employed in the gaming industry to prevent cheating and satisfy regulatory requirements has been to manufacture a gaming device 200 that can use a proprietary processor running instructions to generate the game of chance from an EPROM or other form of non-volatile memory. The executable instructions on the EPROM are static (non-changeable) and must be approved by gaming regulators in a particular jurisdiction and installed in the presence of a person representing the gaming jurisdiction. Any changes to any part of the software required to generate the game of chance, such as adding a new device driver used by the game controller to operate a device during generation of the game of chance can require a new EPROM to be produced, approved by the gaming jurisdiction, and reinstalled on the gaming device 200 under the supervision of a gaming regulator. Regardless of whether the EPROM solution is used, to gain approval in most gaming jurisdictions, a gaming device 200 must demonstrate sufficient safeguards that prevent an operator or player of a gaming device 200 from manipulating hardware and software in a manner that gives them an unfair, and in some cases illegal, advantage.

Further, the gaming device 200 typically includes a means to determine if the code it will execute is valid. If the code is not valid, the gaming device 200 must have a means to prevent the code from being executed. The code validation requirements in the gaming industry affect both hardware and software designs on gaming devices 200.

Even further, a significant difference between gaming devices 200 and common PC-based computer systems is the use of a highly sophisticated RNG that is required to be approved to meet strict regulations that prove that outcomes will be statistically independent, uniformly distributed over their range, unpredictable and pass statistical tests such as chi-square test, equi-distribution test, gap test, runs test, serial correlation test, etc. Further, calculation and validation of the return to player percentage is impacted by the RNG. Published standards defining tests specified in the regulations of various jurisdictions are developed by organizations such as Gaming Laboratories International LLC ("GLI"). Consequently, operation of gaming devices 200 involve a mathematical component as well as devices that are not relevant or present in common PC-based computer systems.

A third significant difference between gaming devices 200 and common PC-based computer systems is that the number and kinds of peripheral devices used on a gaming device 200 are not as widely varying as on PC-based computer systems. Typically, in the gaming industry, gaming devices 200 (as compared to PCs) have been relatively restricted in the functionality and peripherals used, in that the number of peripheral devices and the number of functions of the gaming device 200 is limited. Further, in operation, the functionality of gaming devices 200 are relatively constant once the gaming device 200 is deployed, i.e., new peripherals devices and new gaming software are infrequently added to a deployed gaming device 200. This differs from a PC, where users will continually use different combinations of peripheral devices and software from different manufacturers and connect them to their PCs to suit their needs depending on a desired application. Therefore, the types of peripheral devices connected to a PC may vary greatly from user to user depending in their individual requirements and may vary significantly over time.

Although the variety of peripheral devices available for a PC may be greater than on a gaming device 200, gaming devices 200 still have unique device requirements that differ from a PC, such as device security requirements not usually addressed by PCs. For instance, monetary devices, such as coin dispensers, bill validators and ticket printers, and computing devices that are used to govern the input and output of cash to a gaming device 200 have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming devices 200 that are not typically found in general-purpose computing devices such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in gaming devices 200 to provide a software failure detection mechanism. In contrast to a general-purpose operating system, the operating software of a gaming device periodically accesses control registers in the watchdog timer subsystem to "re-trigger" the watchdog. Should the gaming device operating software fail to access the control registers within a preset timeframe, the watchdog timer will timeout and generate a system reset. Typical watchdog timer circuits for gaming devices contain a loadable timeout counter register to allow the operating software to set the timeout interval within a certain range of time. A differentiating feature of some gaming device circuits is that the operating software cannot completely disable the function of the watchdog timer. In other words, the watchdog timer always functions (from the time power is applied to the gaming device 200 board).

Gaming device 200 platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming device 200. Gaming devices 200 typically have power supplies with tighter voltage margins than that required by the operating circuitry. In addition, the voltage monitoring circuitry implemented in gaming devices 200 typically has two thresholds of control. The first threshold generates a software event that can be detected by the operating software, and an error condition is generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the gaming device 200.

As mentioned above, the standard method of operation for gaming device software is to use a state machine. Different functions of the game (e.g., bet, play, result, points in the graphical presentation, etc.) may be defined as a state. When a game moves from one state to another, critical data regarding the game state is stored in a custom non-volatile memory subsystem. This is critical to ensure the player's wager and credits are preserved and to minimize potential disputes in the event of a malfunction on the gaming device 200.

In general, unlike typical general-purpose computers, the gaming device 200 does not advance from a current state to a subsequent state until critical information that allows the current state to be reconstructed is stored. This feature allows the game to recover operation to the current state of play in the event of a malfunction, loss of power, etc. that occurred just prior to the malfunction. After the state of the gaming device 200 is restored during the play of a game of chance, game play may resume and the game may be completed in a manner that is no different than if the malfunction had not occurred. Typically, battery-backed RAM devices are used to preserve this critical data although other types of non-volatile memory devices may be employed. These memory devices are not normally present in typical general-purpose computers, and if present, are not used in this manner.

As described in the preceding paragraph, when a malfunction occurs during a game of chance, the gaming device 200 may be restored to a state in the game of chance just prior to when the malfunction occurred. The restored state may include metering information and graphical information that was displayed on the gaming device 200 in the state prior to the malfunction. For example, when the malfunction occurs during the play of a card game after the cards have been dealt, the gaming device 200 may be restored with the cards that were previously displayed as part of the card game. As another example, a bonus game may be triggered during the play of a game of chance, where a player is required to make a number of selections on a display screen. When a malfunction occurs after the player has made one or more selections, the gaming device 200 may be restored to a state that shows the graphical presentation at the moment just prior to the malfunction, including an indication of selections that have already been made by the player. In general, the gaming device 200 may be restored to any state in a plurality of states that occur in the game of chance while the game of chance is played or to states that occur between plays of the game.

Game history information regarding previous games played, such as an amount wagered, the outcome of the game and so forth, may also be stored in a non-volatile memory device. The information stored in the non-volatile memory may be detailed enough to reconstruct all or a portion of the graphical presentation that was previously presented on the gaming device 200 and the state of the gaming device 200 (e.g., credits) at the time the game of chance was played. The game history information may be utilized in the event of a dispute. For example, a player may decide that, in a previous game of chance, the player did not receive credit for an award that the player believed to be won. The game history information may be used to reconstruct the state of the gaming device 200 prior, during and/or after the disputed game to demonstrate whether the player was correct or not in that assertion.

Another feature of gaming devices 200, such as gaming devices 104A-X, is that they often contain unique interfaces, including serial interfaces, to connect to specific subsystems internal and external to the gaming devices. The serial devices may have electrical interface requirements that differ from the "standard" EIA 146 serial interfaces provided by general-purpose computers. These interfaces may include the Electronic Industries Alliance's EIA-485 standard, EIA-422 standard, fiber optic, optically coupled serial interfaces, current loop style serial interfaces, etc. In addition, to minimize the required number of serial interfaces internally in the gaming device, serial devices may be connected in a shared, bus, and/or daisy-chain fashion, where multiple peripheral devices are connected to a single serial (or other protocol) channel. The serial interfaces may be used to transmit information using communication protocols that are unique to the gaming industry. For example, the OASIS™ system manufactured by Aristocrat® Technologies, Inc. includes a proprietary communication protocol used for serial communication between gaming devices. As another example, the Slot Accounting System ("SAS"), manufactured by International Game Technology PLC, includes a communication protocol used to transmit information, such as metering information, from a gaming device 200 to a remote device. Often SAS is used in conjunction with a player tracking system.

Gaming devices 200 may alternatively be treated as peripheral devices to a casino communication controller and connected in a shared daisy-chain fashion to a single serial interface. In both cases, the peripheral devices are preferably assigned device addresses. If so, the serial controller circuitry implements a method to generate or detect unique device addresses. General-purpose computer serial ports are not able to do this.

Security monitoring circuits detect intrusion into a gaming device 200 by monitoring security sensors 238 or switches attached to access doors (including the main door) of the main cabinet 218 of the gaming device 200. Preferably, access violations result in suspension of game play and can trigger additional security operations to preserve the current state of game play. These circuits also function when power is off by use of a battery backup. In power-off operation, these circuits continue to monitor the access doors (including the main door) of the gaming device 200. When power is restored, the gaming device 200 can determine whether any security violations occurred while power was off, e.g., via software for reading status registers. This can trigger event log entries and further data authentication operations by the gaming device software.

Trusted memory devices may be included in a game controller 202 of a gaming device 200 to ensure the authenticity of the software that may be stored on memory subsystems. Trusted memory devices and controlling circuitry are typically designed to not allow modification of the code and data stored in the memory device while the memory device is installed in the gaming device. The code and data stored in these devices may include authentication algorithms, RNGs, authentication keys, operating system kernels, etc. The purpose of these trusted memory devices is to provide gaming regulatory authorities a root trusted authority within the computing environment of the gaming device 200 that can be tracked and verified as original. This may be accomplished via removal of the trusted memory device from the gaming device 200 and verification of the secure memory device contents by a separate third-party verification device. Once the trusted memory device is verified as authentic, and based on the approval of the verification algorithms contained in the trusted device, the gaming device 200 is allowed to verify the authenticity of additional code and data that may be located in the game controller 202, such as code and data stored on hard disk drives. Details related to trusted memory devices that may be used in the present invention are described in U.S. Pat. No. 6,685,567, the disclosure of which is incorporated by reference.

Mass storage devices used in a general-purpose computer typically allow code and data to be read from and written to the mass storage device. In a gaming system environment, modification of the gaming code stored on a mass storage device is strictly controlled and would only be allowed under specific maintenance type events with electronic and physical enablers required. Though this level of security could be provided by software, gaming devices 200 that include mass storage devices include hardware-level mass storage data protection circuitry that operates at the circuit level to monitor attempts to modify data on the mass storage device and will generate both software and hardware error triggers should a data modification be attempted without the proper electronic and physical enablers being present.

Although the system shown in FIG. 2 illustrates one example gaming device 200 of the present invention, it is by no means the only gaming device architecture on which the present invention can be implemented. For example, an architecture having a single processor that handles communications as well as routing computations, etc. may be used. Further, other types of interfaces and media could also be used with the gaming device 200. The communication path between components may be bus-based (as shown in FIG. 2) or switch fabric based (such as a cross-bar).

III. Example Non-Standard Progressive Embodiments

III.A. Introduction

This section describes various innovations in controlling progressive awards electronic gaming machines ("EGMs"). In particular embodiments, the disclosed technology allows for the expected value of a jackpot to remain the same across all bets and all denominations through the judicious use of a multiplier. Further, in some embodiments, the progressive hit rate is adjusted so that the lower progressive jackpots do not dominate the game at higher bets. The innovative features of the disclosed technology improve the operation and usability of EGMs by, among other things, maintaining the expected value of a progressive jackpot across a range of different wager options, enhancing the user experience for all types of players (e.g., low-bet players and high-bet players), enticing new users to use the EGMs, and maintaining the interest of current users in the EGMs.

In general, embodiments of the disclosed technology use a multiplier value (explained in more detail below) to satisfy one or more of the following game-design goals for progressive games: (1) the non-multiplied startup should be the same across all bets and denominations (where the non-multiplied startup is the initial value of the progressive jackpot either upon startup or after the progressive jackpot is won); (2) the non-multiplied average jackpot should be the same across all bets and denominations; (3) the multiplied increment rate should be the same across all bets and denominations; (4) the multiplied expected value should be the same across all bets and denominations; and/or (5) the multiplier is used to maintain equivalency across all bets and denominations at the time the progressive jackpot is won.

By maintaining these axioms, uniformity (equivalency) across all bets and denominations can be retained.

To further explain and highlight features of the disclosed technology, the tables below describe game play parameters that can be applied to any progressive game and that provide the benefits of the disclosed technology. The game play parameters can be applied by the game controller 202 as shown in FIG. 2.

In the tables below, the following game play parameters are provided for a particular progressive jackpot:

(a) DENOM ($), which represents the selected denomination of the wager being illustrated (in the illustrated embodiment, the wager is shown as a dollar amount, though other currencies are also possible);

(b) BET (cr), which represents the amount of the selected denomination being wagered (in the illustrated embodiments, the bet is represented as a multiple of a baseline bet of 100 credits, and thus can be represented as a "×1", "×2"; "×3" bet, and so on, though any other bet value can be used as well);

(c) STARTUP ($), which represents the initial value of the progressive jackpot either upon startup or after a progressive jackpot is awarded and the particular progressive jackpot is "reset";

(d) INC ($), which represents the incremental value (in terms of a dollar amount) by which the particular progressive jackpot is incremented after a game is played in which the particular progressive jackpot is not awarded;

(e) INC (%), which represents the incremental value (in terms of a percentage) by which the particular progressive jackpot is incremented after a game is played in which the particular progressive jackpot is not awarded;

(f) HIT RATE, which represents the probability (or odds) for the illustrated wager resulting in the award of the particular progressive jackpot (where the HIT RATE is a value x describing the probability in terms of 1/x);

(g) AVERAGE JACKPOT ($), which represents the average jackpot value for the particular progressive jackpot (in terms of a dollar amount);

(h) MULTIPLIER, which represents a multiplier value that can be applied to various ones of the game play parameters (e.g., one or more of the STARTUP ($), INC ($), INC (%), and/or AVERAGE JACKPOT ($)); further the MULTIPLIER value can be applied at the time of the jackpot being awarded or at the time the jackpot is computed for a particular wager selected by the player;

(i) MUL. STARTUP ($), which represents the STARTUP ($) value as multiplied by the MULTIPLIER;

(j) MULT INCREMENT (%), which represents the INCREMENT (%) value as multiplied by the MULTIPLIER;

(k) MULT AVG JACKPOT ($), which represents the AVERAGE JACKPOT ($) value as multiplied by the MULTIPLIER; and/or (l) EXPECTED VALUE (%), which represents the expected value to the player of the current wager (in terms of a percentage). More specifically, and after accounting for the MULTIPLIER value, the EXPECTED VALUE (%) can be computed as follows: EXPECTED VALUE (%)=MULT AVG JACKPOT ($)/((DENOM ($)×BET (cr))×HIT RATE).

The tables below show only a few illustrative wager variations, including a first basic wager of $1 with a $0.01 denomination (penny), a second wager of $2 with a $0.01 denomination, and a third wager of $5 with a $0.05 denomination (nickel). It should be understood that the principles illustrated by the tables are readily applicable across any other wager amount having different denominations and bet amounts.

Further, it should be understood that the tables below use the average jackpot (AVERAGE JACKPOT and MULT AVG JACKPOT) as a proxy for the actual progressive jackpots that would be computed using the disclosed multiplier technique by the game controller. For example, as one skilled in the art would readily appreciate, the actual pre-multiplied and multiplied progressive jackpot amounts will depend on the current state of the respective progressive jackpot pool (e.g., starting at the startup value and as modified over time by the increment amount until the progressive jackpot is won).

III.B. Standard Progressive

In this subsection, an example of a standard progressive is explained. In particular, Table 1 below illustrates a penny game ($0.01) at 100 credits and 200 credits and a nickel game ($0.05) at 100 credits. In the example below, all are considered to be linked to the same progressive jackpot. As can be seen from Table 1, the average jackpot is the same across all bets and denomination, but as the bet or denomination increases the hit rate of the progressive decreases proportionally.

TABLE 1

| Standard Progressive | | | |
|---|---|---|---|
| DENOM ($) | $ 0.01 | $ 0.01 | $ 0.05 |
| BET (cr) | 100 | 200 | 100 |
| STARTUP ($) | $ 10.00 | $ 10.00 | $ 10.00 |
| INC ($) | $ 0.0100 | $ 0.0200 | $ 0.0500 |
| INC (%) | 1.000% | 1.000% | 1.000% |
| HIT RATE | 250 | 125 | 50 |
| AVERAGE JACKPOT ($) | $ 12.50 | $ 12.50 | $12.50 |
| MULTIPLIER | 1 | 1 | 1 |
| MUL. STARTUP ($) | $ 10.00 | $ 10.00 | $10.00 |
| MULT INCREMENT (%) | 1.000% | 1.000% | 1.000% |
| MULT AVG JACKPOT ($) | $ 12.50 | $ 12.50 | $12.50 |
| EXPECTED VALUE (%) | 5.000% | 5.000% | 5.000% |

In the standard progressive, the non-multiplied startup is uniform, the non-multiplied average jackpot is uniform, multiplied increment is uniform, and the expected value is uniform.

III.C. First Example Non-Standard Progressive Embodiment

Table 2 below illustrates aspects of a first example embodiment of a non-standard approach to controlling progressive jackpots. In the illustrated embodiment, the progressive startup is the same across all bets, the hit rate is also the same across all bets and denominations. The increment is a consistent dollar value across all bets and denominations; however, this means that the increment rate decreases as the bet or denomination increases. To maintain uniform expected value across the different bets and denominations, the awarded progressive is multiplied by a multiplier value (shown as the variable MULTIPLIER value) that is selected to maintain equivalent expected values for each bet multiplier and/or denomination. The table below shows a first embodiment of a non-standard progressive that illustrates this point. As can be seen, the non-modified average jackpot is uniform (constant or equivalent) across all bets and denominations (as seen by the AVERAGE JACKPOT row). However, the average jackpot is multiplied by the bet multiplier or denomination multiplier (shown as MULTIPLIER) resulting in a multiplied jackpot value (shown as MULT AVG JACKPOT) to insure an equivalent expected value (shown as EXPECTED VALUE.)

TABLE 2

| First Example Non-Standard Progressive Embodiment | | | |
|---|---|---|---|
| DENOM ($) | $ 0.01 | $ 0.01 | $ 0.05 |
| BET (cr) | 100 | 200 | 100 |
| STARTUP ($) | $ 10.00 | $ 10.00 | $ 10.00 |
| INC ($) | $ 0.0100 | $ 0.0100 | $ 0.0100 |
| INC (%) | 1.000% | 0.500% | 0.200% |
| HIT RATE | 250 | 250 | 250 |
| AVERAGE JACKPOT ($) | $ 12.50 | $ 12.50 | $ 12.50 |
| MULTIPLIER | 1 | 2 | 5 |
| MUL. STARTUP ($) | $ 10.00 | $ 20.00 | $ 50.00 |
| MULT INCREMENT (%) | 1.000% | 1.000% | 1.000% |
| MULT AVG JACKPOT ($) | $ 12.50 | $ 25.00 | $ 62.50 |
| EXPECTED VALUE (%) | 5.000% | 5.000% | 5.000% |

In this first example non-standard progressive embodiment, the non-multiplied startup values (STARTUP) are uniform (constant or equivalent), the hit rate values (HIT RATE) are uniform, the non-multiplied average jackpot values (AVERAGE JACKPOT) are uniform, the multiplied increment values (MULT INCREMENT) are uniform, and the expected values (EXPECTED VALUE) are uniform.

In this embodiment, and as can be seen, the use of the multiplier allows for the game to have the same hit rate (HIT RATE) across both different denomination and different wager amounts being wagered while also maintaining a common expected value across those wagers. In particular, the multiplier alters the progressive jackpot amount so that the higher-betting players (shown in the last two columns) are rewarded a proportionally higher progressive jackpot amount. This creates a progressive game that has fair progressive awards across all wager amounts.

III.D. Second Example Non-Standard Progressive Embodiment

Table 3 below illustrates aspects of a second example embodiment of a non-standard approach to controlling progressive jackpots. In the illustrated embodiment, the progressive startup is the same across all bets, the hit rate improves, but not proportionally, as the bet and/or denomination increases. In addition, the increment rate decreases as the bet or denomination increases. To maintain a uniform (equivalent or constant) expected value across the different bets and denominations, the awarded progressive is multiplied by a relative bet and/or denomination multiplier (MULTIPLIER).

TABLE 3

Second Example Non-Standard Progressive Embodiment

| | | | |
|---|---|---|---|
| DENOM ($) | $ 0.01 | $ 0.01 | $ 0.05 |
| BET (cr) | 100 | 200 | 100 |
| STARTUP ($) | $ 10.00 | $ 10.00 | $ 10.00 |
| INC ($) | $ 0.0100 | $ 0.0133 | $ 0.0167 |
| INC (%) | 1.000% | 0.667% | 0.333% |
| HIT RATE | 250 | 187.5 | 150 |
| AVERAGE JACKPOT ($) | $ 12.50 | $ 12.50 | $ 12.50 |
| MULTIPLIER | 1 | 1.5 | 3 |
| MUL. STARTUP ($) | $ 10.00 | $ 15.00 | $ 30.00 |
| MULT INCREMENT (%) | 1.000% | 1.000% | 1.000% |
| MULT AVG JACKPOT ($) | $ 12.50 | $ 18.75 | $ 37.50 |
| EXPECTED VALUE (%) | 5.000% | 5.000% | 5.000% |

As can be seen, the average progressive jackpot (AVERAGE JACKPOT) is uniform across all bets and denominations. However, the progressive jackpot is multiplied by the relative bet multiplier or relative denomination multiplier (MULTIPLIER) to insure a uniform expected value (EXPECTED VALUE). The multiplied average jackpot (MULT AVG JACKPOT) shows the jackpot value after being multiplied.

In this embodiment, the non-multiplied startup values (STARTUP) are uniform, the non-multiplied average jackpot values (AVERAGE JACKPOT) are uniform, the multiplied jackpot amount values (MULT AVG JACKPOT) are uniform, and the expected values (EXPECTED VALUE) are uniform.

The example embodiment shown in Table 3 illustrates the flexibility provided by the progressive gaming mechanic of the disclosed technology. In particular, Table 3 illustrates how any one or more of the pre-multiplied values illustrated in the tables can be adjusted and modified in accordance with the design goals of the game designer while still producing a common expected value across different wager denominations and/or bet sizes.

III.E. Example Displays for Nonstandard Progressives

In this subsection, example displays are presented that account for and incorporate the non-progressive gaming schemes disclosed above. Although the illustrated displays are shown as being part of a particular game (here, a Tarzan-themed game), it is understood that this by way of example only and that the disclosed display techniques can be updated to any underlying game.

Figure 3:
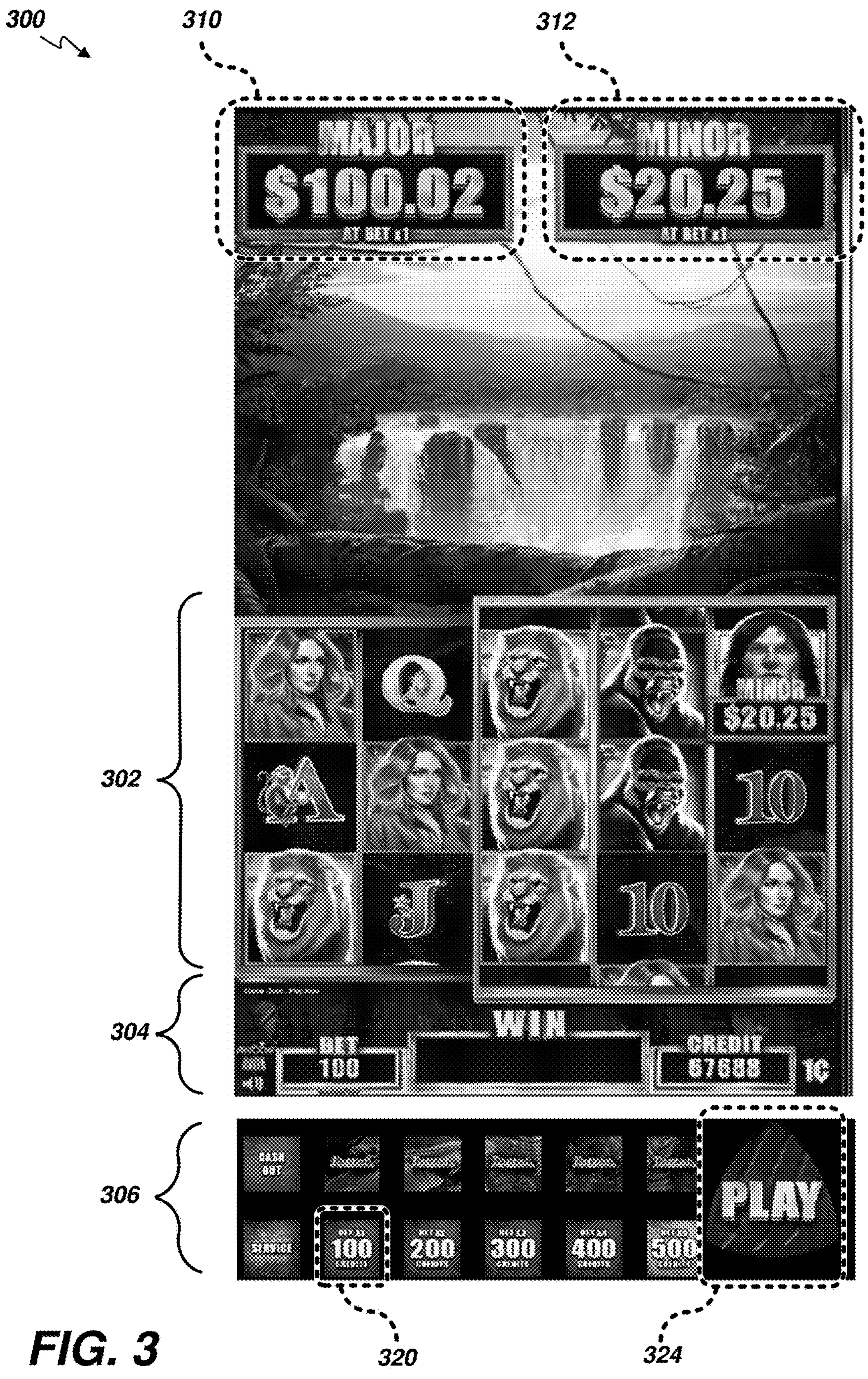
FIGS. 3-8 are example screen shots of a display screen of an EGM illustrating features of the disclosed technology.

FIG. 3 shows an example screen shot 300 of a display screen of an EGM for a reel game (e.g., a base reel game). The example screen shot 300 may be rendered on a main display screen, secondary display screen, or other display screen of an EGM.

The example screen shot 300 shows a reel area 302, supplemental information area 304, and a button deck area 306 (e.g., representing the buttons on the button deck 120 that the player can actuate during game play). The reel area 302 shows viewable portions of five reels. For each of the five reels, the viewable portion of the reel encloses three positions of symbols that span the reel area. Further, as illustrated by the example of FIG. 3, the viewable portion of one or more of the reels can be partially expanded to show one or both of a portion of a next reel position for a particular reel and/or a just-passed reel position for a particular. For instance, in the illustrated embodiment, the reel area 302 shows partially expanded viewing portions for reels three, four, and five that reveal a portion of the next reel portion for the respective reel as well as a just-passed portion for the respective reel (meaning that the reel position is just beyond the available reel positions in the real area 302. The supplemental information area 304 presents information such as a current bet amount, a current bet level (e.g., ×1, ×2, ×3, ×4, ×5), a count of pay lines that are monitored, an amount of credits remaining, and/or a win amount for a round of play. The button deck area 306 shows an example set of buttons for selecting a wager option available to the player. In the illustrated embodiment, the button deck area includes five betting options from a baseline bet of 100 credits, including ×1, ×2, ×3, ×4, ×5 betting options.

The example screen shot 300 also shows two progressive jackpot areas 310, 312. In particular, progressive jackpot area 310 is associated with a first progressive jackpot (here, labeled "MAJOR") and shows the current value of that progressive jackpot (in this example, "$100.02"). Progressive jackpot area 310 also includes a juxtaposed subarea displaying an indicator showing the currently selected bet level (e.g., ×1, ×2, ×3, ×4, ×5). In the illustrated embodiment, the currently selected bet level is "at bet ×1" (representing a 100 credit bet), as shown by highlighted button 320 and which can be finally wagered upon game initiation (as started by "PLAY" button 324) and also by the "bet" portion of supplemental information area 304. Further, progressive jackpot area 312 is associated with a second progressive jackpot (here, labeled "MINOR") and shows the current value of that progressive jackpot (in this example, "$20.25"). Progressive jackpot area 312 also includes a justaposed subarea displaying an indicator showing the currently selected bet level, which again is "at bet ×1" (representing a 100 credit bet), as shown by highlighted button 320 and also by the "bet" portion of supplemental information area 304.

Figure 4:
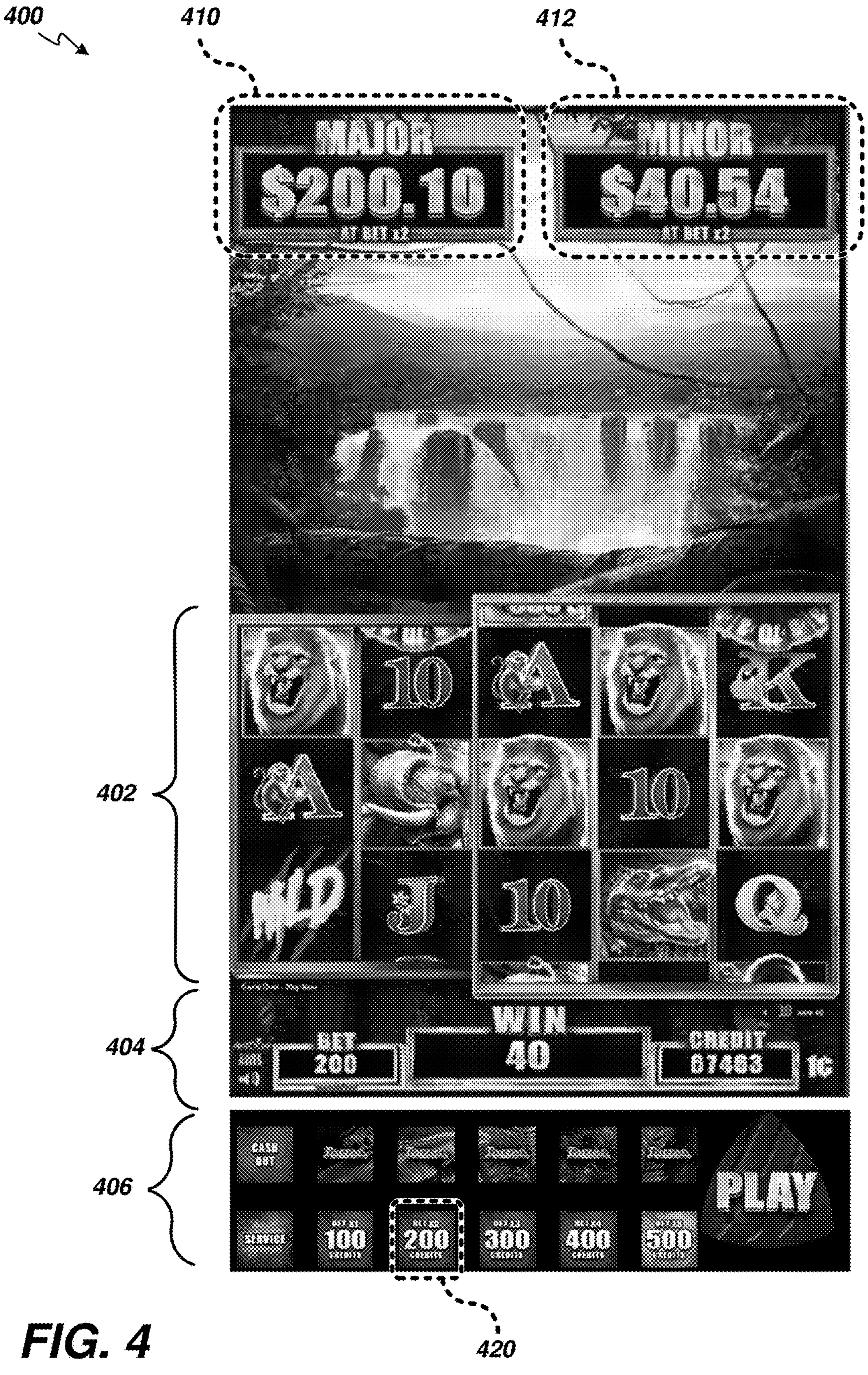

FIG. 4 shows a further example screen shot 400 of the display screen of FIG. 3 in a further state. As above, the example screen shot 400 may be rendered on a main display screen, secondary display screen, or other display screen of an EGM. The example screen shot 400 again shows reel area 402, supplemental information area 404, and a button deck area 406 as above.

The example screen shot 400 also shows two progressive jackpot areas 410, 412 corresponding to updated versions of the progressive jackpot areas 310, 312. The progressive jackpot areas 410, 412 show the multiplied values of the values shown in 310, 312 in accordance with the currently selected bet level. In this example, the progressive jackpot area 312 includes a subarea displaying an indicator showing the currently selected bet level, which here is "at bet ×2" (representing a 200 credit bet), as shown by highlighted button 420 and also by the "bet" portion of the supplemental information area 404. In more detail, the progressive jackpot areas 410, 412 display the progressive jackpot values of "$200.10" and "$40.54", respectively, which are two times the progressive jackpot values shown in 310, 312 (as further identified by the "at bet ×2" indicator of progressive jackpot areas 410, 412).

FIG. 4 therefore illustrates how the progressive jackpot values can be computed and displayed to the player as a result of the selected wager and as a result of an underlying multiplier value as described above.

Figure 5:
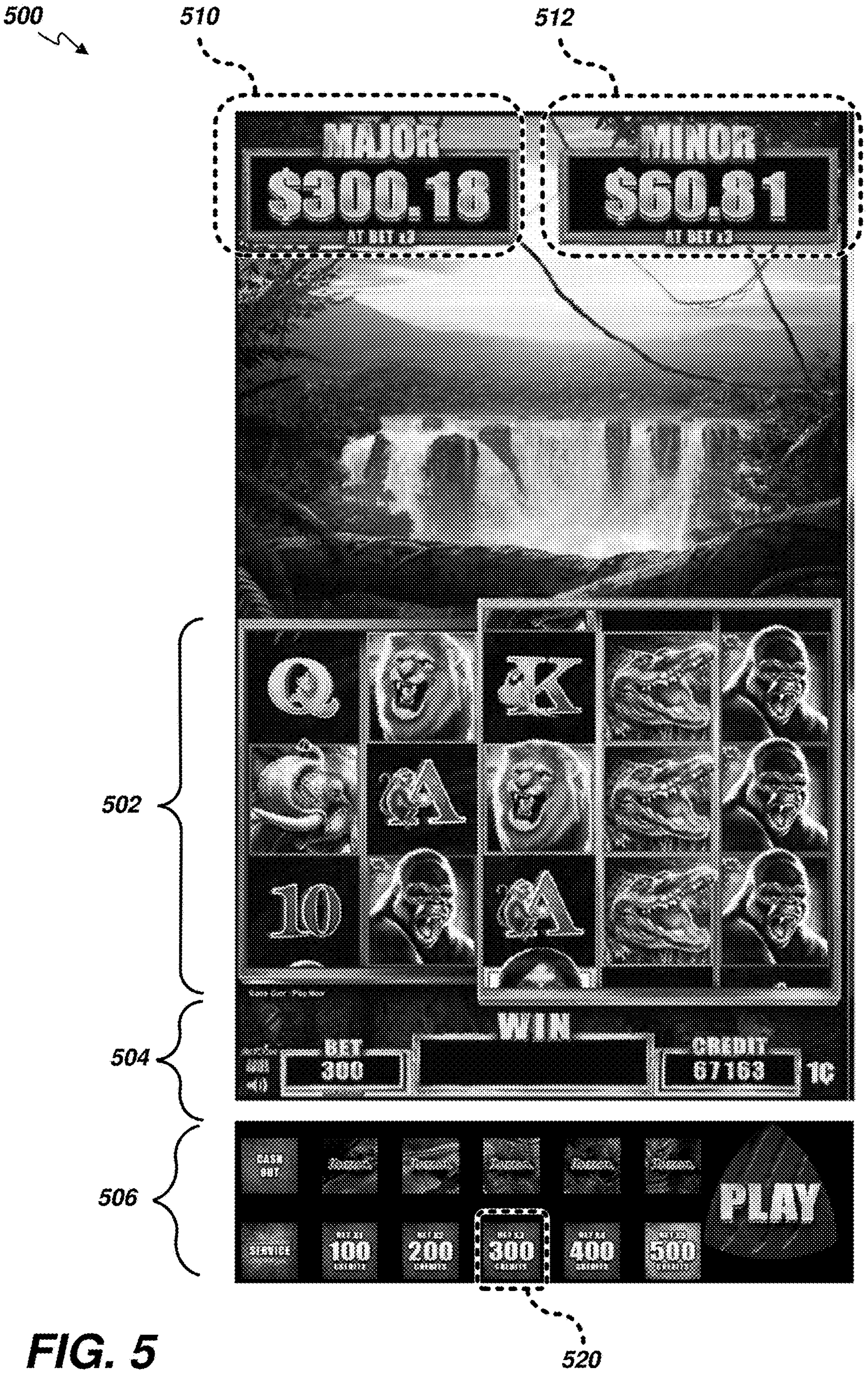

FIG. 5 shows a further example screen shot 500 of the display screen of FIG. 3 in a further state. As above, the example screen shot 500 may be rendered on a main display screen, secondary display screen, or other display screen of an EGM. The example screen shot 500 again shows reel area 502, supplemental information area 504, and a button deck area 506 as above.

The example screen shot 500 also shows two progressive jackpot areas 510, 512 corresponding to updated versions of the progressive jackpot areas 310, 312. The progressive jackpot areas 510, 512 show the multiplied values of the values shown in 310, 312 in accordance with the currently selected bet level. In this example, the progressive jackpot area 512 includes a subarea displaying an indicator showing the currently selected bet level, which here is "at bet ×3" (representing a 300 credit bet), as shown by highlighted button 520 and also by the "bet" portion of the supplemental information area 504. In more detail, the progressive jackpot areas 510, 512 display the progressive jackpot values of "$300.18" and "$60.81", respectively, which are three times the progressive jackpot values shown in 310, 312 (as further identified by the "at bet ×3" indicator of progressive jackpot areas 510, 512).

FIG. 5 therefore also illustrates how the progressive jackpot values can be computed and displayed to the player as a result of the selected wager and as a result of an underlying multiplier value as described above.

Figure 6:
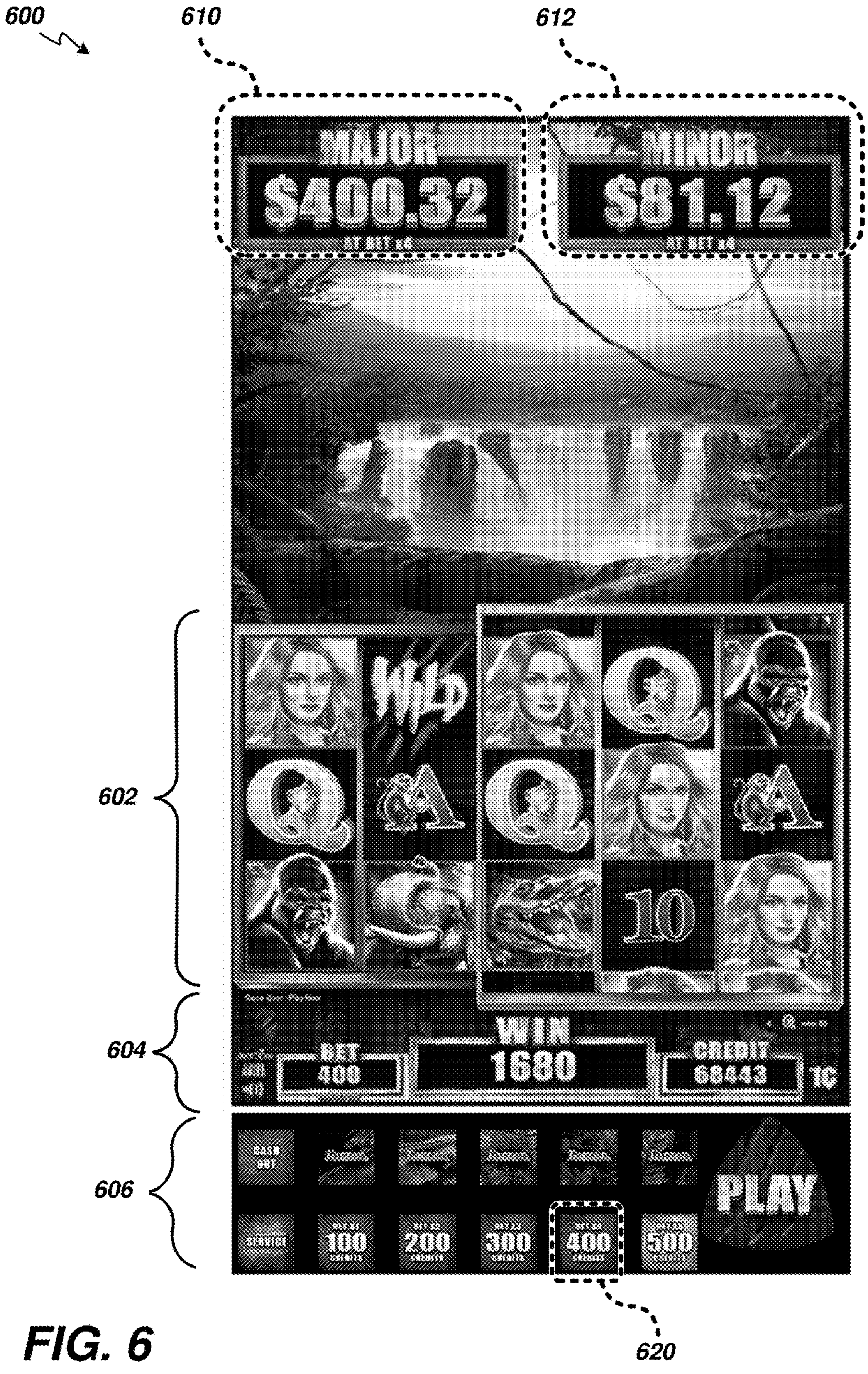

FIG. 6 shows a further example screen shot 600 of the display screen of FIG. 3 in a further state. As above, the example screen shot 600 may be rendered on a main display screen, secondary display screen, or other display screen of an EGM. The example screen shot 600 again shows reel area 602, supplemental information area 604, and a button deck area 606 as above.

The example screen shot 600 also shows two progressive jackpot areas 610, 612 corresponding to updated versions of the progressive jackpot areas 310, 312. The progressive jackpot areas 610, 612 show the multiplied values of the values shown in 610, 612 in accordance with the currently selected bet level. In this example, the progressive jackpot area 612 includes a subarea displaying an indicator showing the currently selected bet level, which here is "at bet ×4" (representing a 400 credit bet), as shown by highlighted button 620 and also by the "bet" portion of the supplemental information area 604. In more detail, the progressive jackpot areas 610, 612 display the progressive jackpot values of "$400.32" and "$81.12", respectively, which are four times the progressive jackpot values shown in 310, 312 (as further identified by the "at bet ×4" indicator of progressive jackpot areas 610, 612).

FIG. 6 therefore also illustrates how the progressive jackpot values can be computed and displayed to the player as a result of the selected wager and as a result of an underlying multiplier value as described above.

Figure 7:
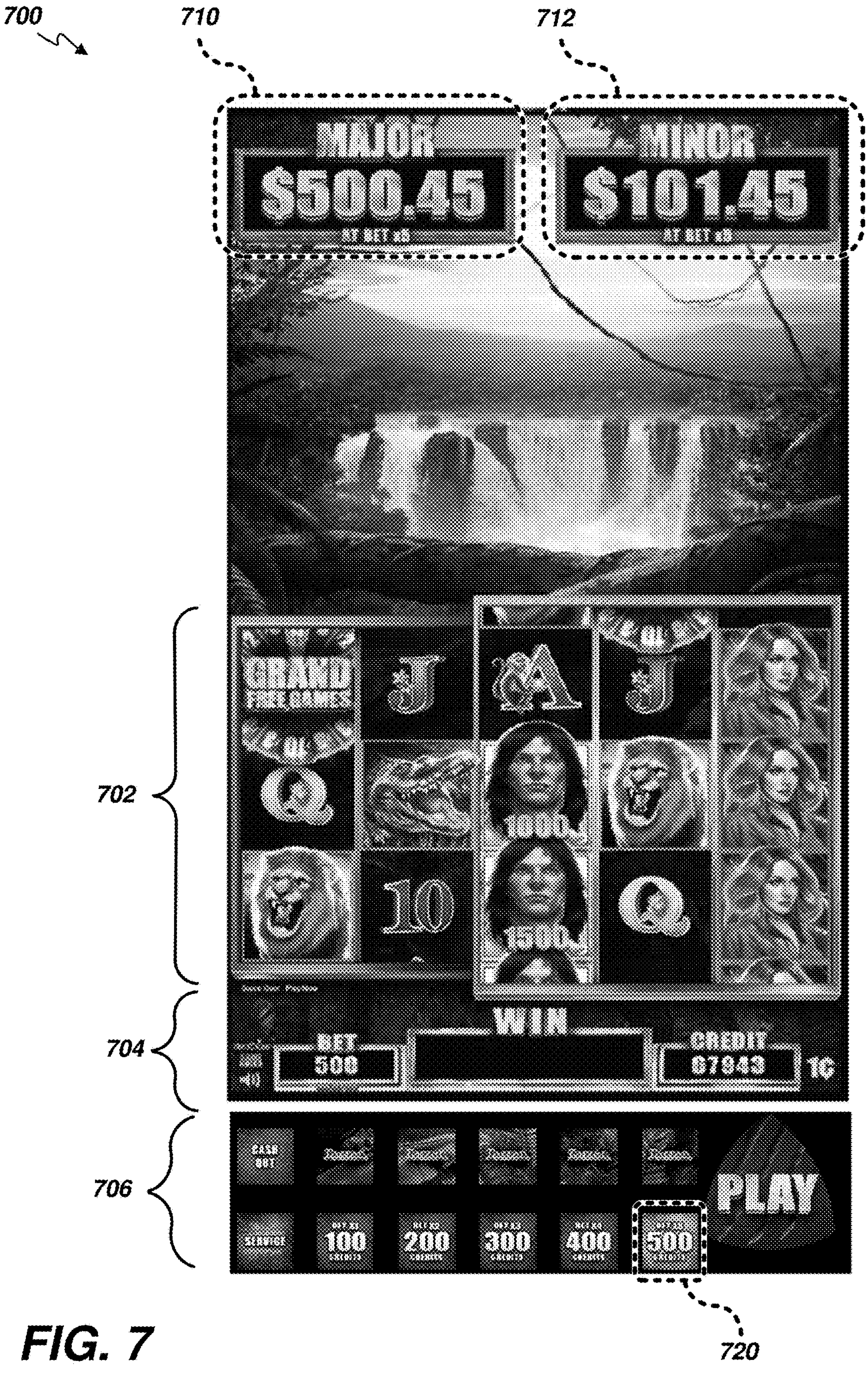

FIG. 7 shows a further example screen shot 700 of the display screen of FIG. 3 in a further state. As above, the example screen shot 700 may be rendered on a main display screen, secondary display screen, or other display screen of an EGM. The example screen shot 700 again shows reel area 702, supplemental information area 704, and a button deck area 706 as above.

The example screen shot 700 also shows two progressive jackpot areas 710, 712 corresponding to updated versions of the progressive jackpot areas 310, 312. The progressive jackpot areas 710, 712 show the multiplied values of the values shown in 310, 312 in accordance with the currently selected bet level. In this example, the progressive jackpot area 712 includes a subarea displaying an indicator showing the currently selected bet level, which here is "at bet ×5" (representing a 500 credit bet), as shown by highlighted button 720 and also by the "bet" portion of the supplemental information area 704. In more detail, the progressive jackpot areas 710, 712 display the progressive jackpot values of "$500.45" and "$101.45", respectively, which are five times the progressive jackpot values shown in 710, 712 (as further identified by the "at bet ×5" indicator of progressive jackpot areas 710, 712).

FIG. 7 therefore also illustrates how the progressive jackpot values can be computed and displayed to the player as a result of the selected wager and as a result of an underlying multiplier value as described above.

Figure 8:
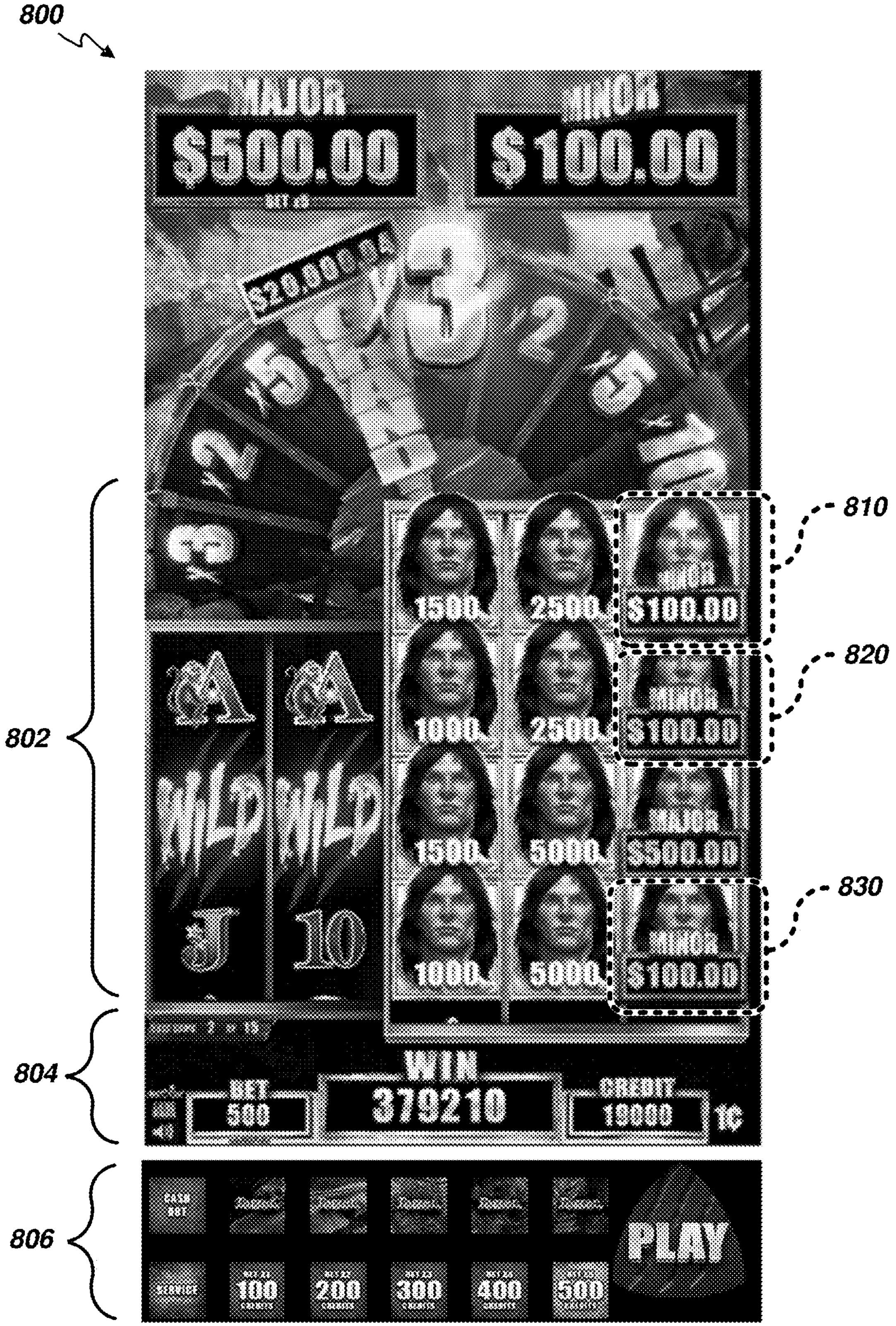

FIG. 8 shows an example screen shot 800 of a display screen of an EGM for a reel game (e.g., a base reel game) showing a further aspect of the disclosed technology. The example screen shot 800 may be rendered on a main display screen, secondary display screen, or other display screen of an EGM.

The example screen shot 800 shows a reel area 802, supplemental information area 804, and a button deck area 806 (e.g., representing the buttons on the button deck 120 that the player can actuate during game play). The reel area 802 shows viewable portions of five reels. In this example, the viewable portion of the reel varies between different columns. In general, the viewable portion of one or more reels can expand to show additional reel positions (such as four reel positions, five reel positions, or any other number of additional reel positions). The expansion can be triggered by a variety of events, including a certain symbol or symbol combination appearing at the first, second, third, and/or fourth reels. In the illustrated embodiment, the expansion of reels three, four, and five is triggered by two "wild" being hit on the reels one and two.

The example screen shot 800 also shows how, in certain embodiments, two or more instances of an available progressive jackpot award can be awarded. Still further, in the illustrated implementation, the two instances of the available progressive jackpot can have the same award amount. In particular, in screen shot 800, and for this example game, a symbol combination has been achieved where the fifth reel awards four progressive jackpot awards, including three instances of a same progressive jackpot award (here, the "MINOR" progressive jackpot). Further, in accordance with embodiments of the disclosed technology, the value of the multiple awarded instances of the same (or common) progressive jackpot is locked and awarded to the player (as shown at 810, 820, and 830). In other words, the awarding of one instance of the progressive jackpot does not cause the second instance of that progressive jackpot to reset to the STARTUP value.

III.F. Example General Embodiments of the Disclosed Technology

Figure 9:
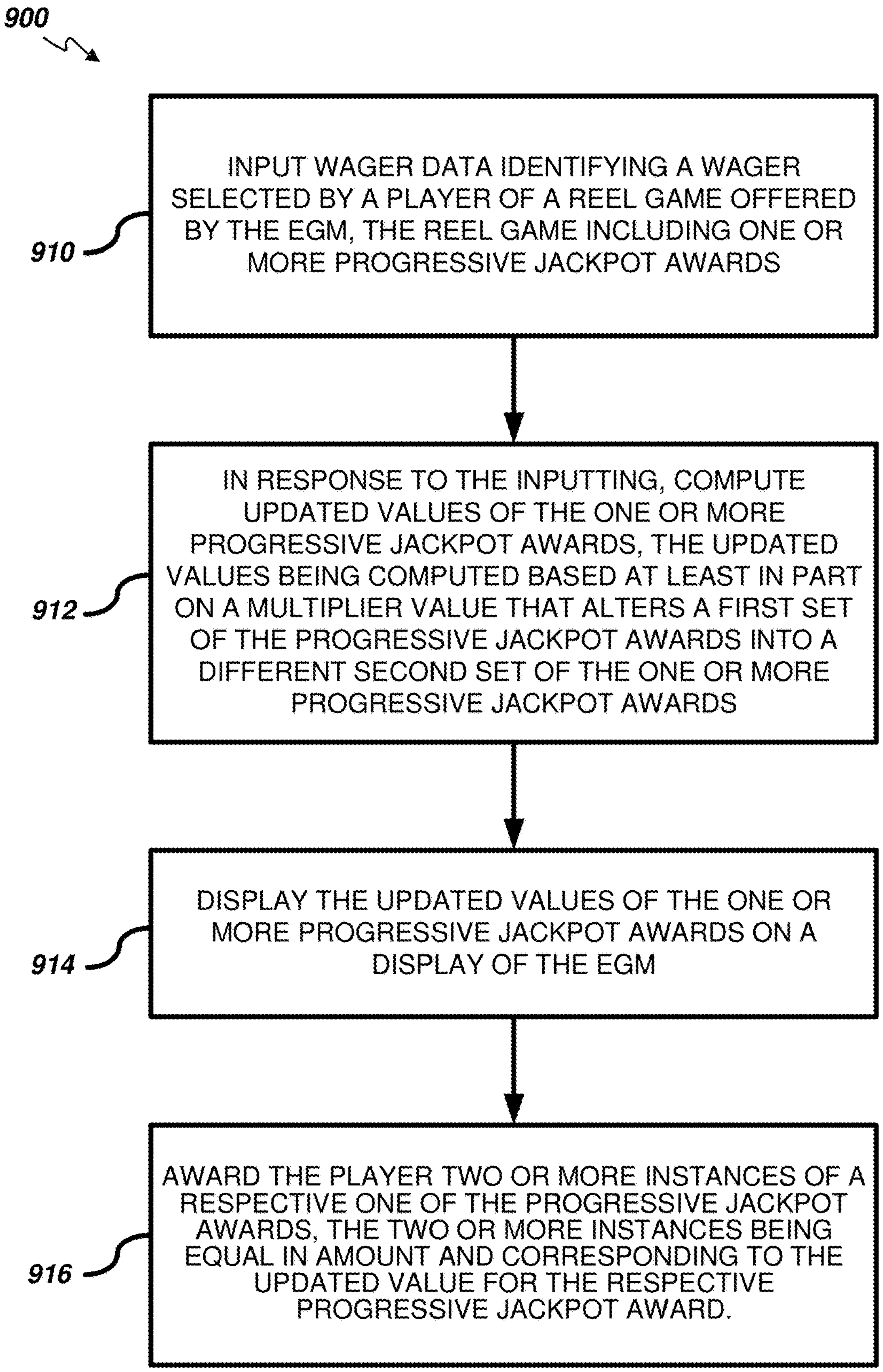
FIG. 9 is a flowchart illustrating a first example technique for performing embodiments of the disclosed technology.

FIG. 9 is a flow chart 900 illustrating an example embodiment for controlling and/or providing progressive game play data to an electronic gaming machine ("EGM"). In particular, the method of FIG. 9 can be performed by a game controller of the EGM or an EGM server in communication with an EGM. Although the illustrated method is described in a particular, sequential order, it should be understood that this manner of description encompasses rearrangement. For example, operations described sequentially may in some cases be rearranged or performed concurrently.

At 910, wager data identifying a wager selected by a player of a reel game offered by the EGM is input. In this embodiment, the reel game includes one or more progressive jackpot awards.

At 912, in response to the inputting, updated values of the one or more progressive jackpot awards are computed. In this embodiment, the updated values are computed based at least in part on a multiplier value that alters a first set of the one or more progressive jackpot awards into a second set of the one or more progressive jackpot awards different than the first set.

In particular embodiments, and as explained above, the multiplier value (which is a value that varies across different wagers) creates a constant expected value for the player. In some implementations of these embodiments, for example, the game has a constant hit rate across all wagers for a respective one of the one or more progressive jackpot awards (e.g., as illustrated by Table 2). In other implementations of these embodiments, the game has a non-constant hit rate across all wagers for a respective one of the one or more progressive jackpot awards but also uses the multiplier value to achieve the constant expected value for the player (e.g., as illustrated by Table 3, which shows an example of how the hit rate can vary but how a varying multiplier value can be used to achieve a desired, constant expected value for the player). In some embodiments, the multiplier value creates a constant expected value for the player for one or more of a. different denominations being selected for the wager amount; and/or b. different bet amounts for the wager amount.

At 914, the updated values of the one or more progressive jackpot awards are displayed on a display of the EGM. In certain examples, the updated values of the one or more progressive jackpot awards are displayed to the player when the player selects a different wagering option and before the player finalizes the wager. The different wagering option can be, for instance, a change in a denomination for the wager or a change in an amount of the wager (e.g., as selected by a bet multiplier input button, as shown in the button deck area of FIGS. 3-7).

At 916, and optionally depending on the particular reel positions randomly selected for the reel game, the method further comprises awarding the player two or more instances of a respective one of the one or more progressive jackpot awards, wherein the two or more instances are equal in amount and correspond to the updated value for the respective one of the one or more progressive jackpot awards (e.g., as shown in FIG. 8).

The method of FIG. 9 can be performed in a variety of different physical embodiments. For instance, the embodiments and/or implementations discussed above with respect to FIG. 9 can be implemented by an EGM comprising a cabinet; a display screen; one or more input buttons; a credit input device; and control logic configured to perform operations to control a user interface of the EGM, the operations comprising any of the embodiments and/or implementations discussed above with respect to FIG. 9. Further, the embodiments and/or implementations discussed above with respect to FIG. 9 can be implemented by a an electronic gaming server comprising a network interface configured to facilitate communication between the electronic gaming server and an EGM; and control logic configured to perform operations to control a user interface of the EGM, the operations comprising any of the embodiments and/or implementations discussed above with respect to FIG. 9.

Figure 10:
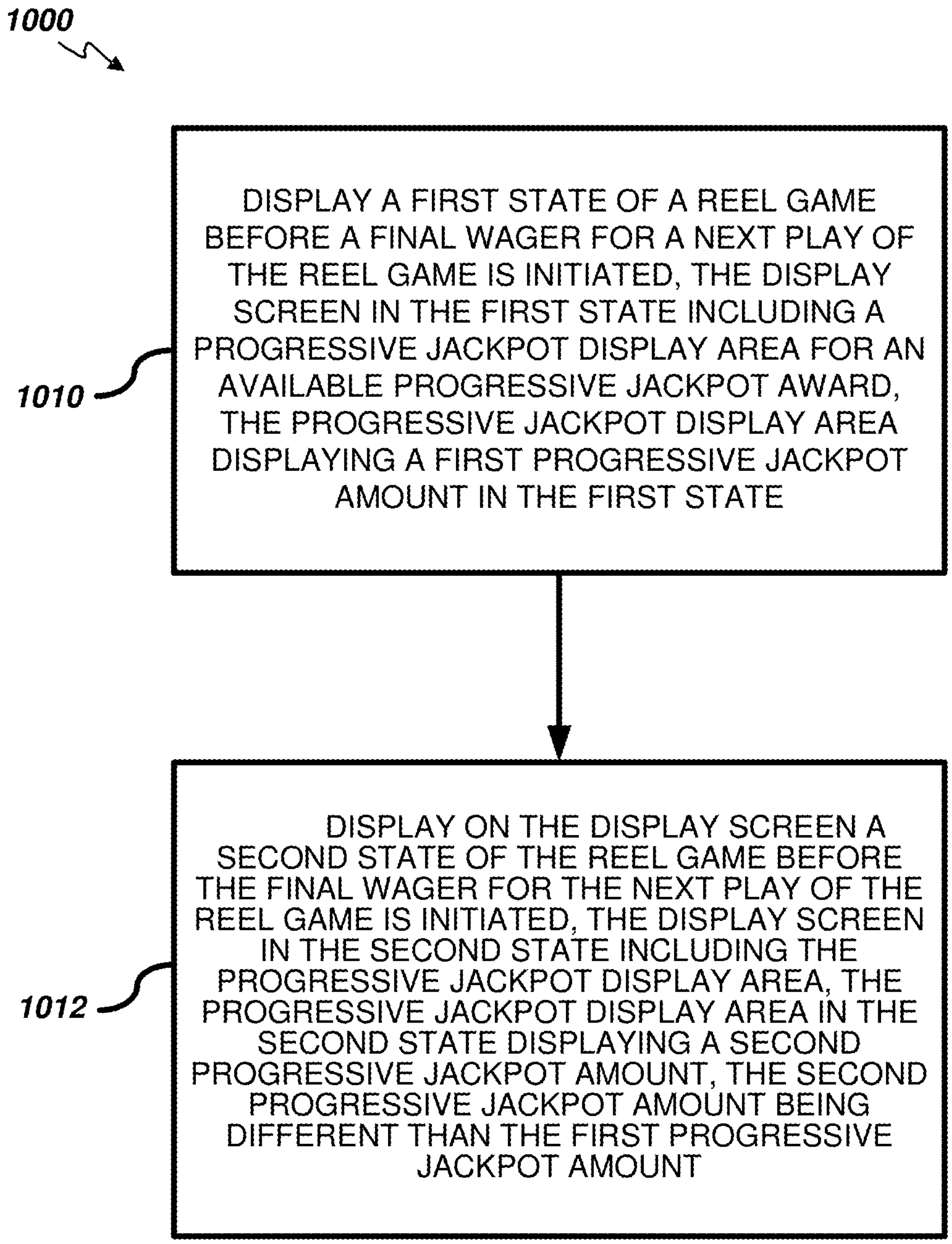
FIG. 10 is a flowchart illustrating a second example technique for performing embodiments of the disclosed technology.

FIG. 10 is a flow chart 1000 illustrating another example embodiment for controlling and/or displaying progressive game play data at an electronic gaming machine ("EGM"). In particular, the method of FIG. 10 can be performed by a game controller of the EGM or an EGM server in communication with an EGM. Although the illustrated method is described in a particular, sequential order, it should be understood that this manner of description encompasses rearrangement. For example, operations described sequentially may in some cases be rearranged or performed concurrently.

At 1010, a first state of a reel game before a final wager for a next play of the reel game is initiated is displayed on a display screen of an EGM. In this embodiment, the display screen in the first state includes a progressive jackpot display area for an available progressive jackpot award, the progressive jackpot display area displaying a first progressive jackpot amount in the first state.

At 1012, a second state of the reel game before the final wager for the next play of the reel game is initiated is displayed on the display screen of the EGM. In this embodiment, the display screen in the second state includes the progressive jackpot display area, the progressive jackpot display area in the second state displaying a second progressive jackpot amount, the second progressive jackpot amount being different than the first progressive jackpot amount.

In particular implementations, the displaying on the display screen of the second state is responsive to input received from the one or more input buttons, and the input received from the one or more input buttons alters a wager amount for the reel game or a denomination for the reel game. In such implementations, a constant expected value can be maintained for the reel game in view of the altered wager amount for the reel game or the altered denomination for the reel game. In some implementations, a constant hit rate across all wagers for the available progressive jackpot award (e.g., as illustrated by the example of Table 2). In other implementations, a non-constant hit rate is provided across all wagers for the available progressive jackpot award and a variable multiplier value is applied (e.g., in combination with the non-constant hit rate) to achieve a constant expected value across all wagers (e.g., as illustrated by the example of Table 3).

In some implementations, and as described above, a multiplier value is used to create a constant expected value for different denominations being selected for a wager for the reel game or different bet amounts for the wager for the reel game.

Still further, 1016, and optionally depending on the particular reel positions randomly selected for the reel game, the method further comprises awarding the player two or more instances of the available progressive jackpot award, wherein the two or more instances are equal in amount (e.g., as shown in FIG. 8.).

The method of FIG. 10 can be performed in a variety of different physical embodiments. For instance, the embodiments and/or implementations discussed above with respect to FIG. 10 can be implemented by an EGM comprising a cabinet; a display screen; one or more input buttons; a credit input device; and control logic configured to perform operations to control a user interface of the EGM, the operations comprising any of the embodiments and/or implementations discussed above with respect to FIG. 10. Further, the embodiments and/or implementations discussed above with respect to FIG. 10 can be implemented by a an electronic gaming server comprising a network interface configured to facilitate communication between the electronic gaming server and an EGM; and control logic configured to perform operations to control a user interface of the EGM, the operations comprising any of the embodiments and/or implementations discussed above with respect to FIG. 10.

Figure 11:
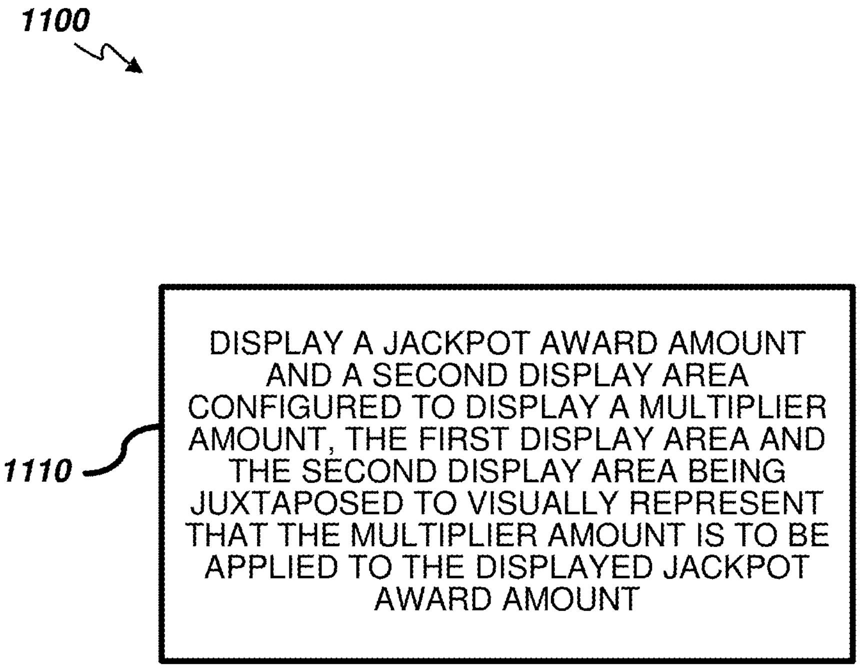
FIG. 11 is a flowchart illustrating a third example technique for performing embodiments of the disclosed technology.

FIG. 11 is a flow chart 1100 illustrating another example embodiment for controlling and/or displaying progressive game play data at an electronic gaming machine ("EGM"). In particular, the method of FIG. 10 can be performed by a game controller of the EGM or an EGM server in communication with an EGM. Although the illustrated method is described in a particular, sequential order, it should be understood that this manner of description encompasses rearrangement. For example, operations described sequentially may in some cases be rearranged or performed concurrently.

At 1110, a first display area configured to display a jackpot award amount is displayed and a second display area configured to display a multiplier amount is displayed. In this embodiment, the first display area and the second display area are juxtaposed to visually represent that the multiplier amount is to be applied to the displayed jackpot award amount. For example, the multiplier amount is generated based on the amount of the wager and the generated multiplier amount is displayed in the second display area.

Further, in certain embodiments, the multiplier amount applied to the jackpot award amount creates a multiplied jackpot award amount, the first display area is configured to display the multiplied jackpot award amount, and the multiplied jackpot award amount is different than an unmultiplied jackpot award amount. As discussed above, the multiplier amount is applied in order to maintain a constant expected value across different wager amounts.

In general, the disclosed technology allows greater control for the game designer in designing progressive awards. This is especially true for progressive awards that are small compared to the size of the bet. For example, a $10 progressive at a 50 cent bet is a progressive award 20 times the player's bet, however that same progressive at a $2.50 bet is merely 4 times the player's bet. By utilizing the disclosed technology, the $10 progressive at 50 cents can become a $50 jackpot at the $2.50 bet. This becomes a more substantial prize for the $2.50 player. And, by using aspects of the disclosed technology, makes the expected value of the progressive equal across different wager amounts (which may vary by amount and/or denomination).

The one or more innovations described herein have numerous advantageous, including one or more of (1) giving the game designer more options when designing progressive jackpots; (2) adjusting the progressive win amount to be relative to the increase in bet; and/or (3) adjusting the progressive hit rate so that the lower progressives do not dominate the game at higher bets.

Depending on the implementation, various form factors of EGMs can incorporate these innovations. For example, for a "thick client" implementation, an EGM (such as a gaming device 104A-X in FIG. 1 or gaming device 200 in FIG. 2) stores computer-executable instructions for controlling one or more wagering games in local memory of the EGM and executes those instructions in one or more local processors of the EGM. The computer-executable instructions for controlling the game(s) may be stored within the EGM (e.g., at a factory) prior to installation of the EGM at a gaming establishment. Or, the computer-executable instructions for controlling the game(s) may be stored within the EGM after installation of the EGM at a gaming establishment (e.g., by downloading the instructions to the EGM over a network, or by installing memory that stores the instructions into the EGM, then configuring the EGM). In such a "thick client" implementation, a game controller of the EGM conducts one of the wagering game(s) and manages various interfaces of the EGM to receive player inputs and commands. Or, as another example, for a "thin client" implementation, computer-executable instructions for controlling one or more wagering games are stored in memory of a gaming server (e.g., central determination gaming system server or other remote host) and executed in one or more processors of the gaming server. The game server remotely controls one of the wagering game(s) over a network, and the EGM displays screens for the wagering game and manages interfaces to receive player inputs and commands.

Still further, any of the disclosed embodiments can be implemented in a single EGM offering one or more progressive jackpot awards or in a linked system comprising multiple EGMs. In such linked systems, the progressive jackpot awards can be controlled by a central progressive controller.

IV. Alternatives and Variations

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

The Title (set forth at the beginning of the first page of this disclosure) is not to be taken as limiting in any way as the scope of the disclosed embodiments.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget." Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget"" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When introducing elements of aspects of the present disclosure or embodiments thereof, the articles "a," "an," "the," and "said" are intended to mean that there are one or more of the elements. The terms "comprising," including," and "having" are intended to be inclusive and mean that there may be additional elements other than the listed elements.

When a single device, component, structure, or article is described herein, more than one device, component, structure or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component, structure, or article is described herein (whether or not they cooperate), a single device, component, structure, or article may alternatively be used in place of the more than one device, component, structure, or article that is described. For example, a plurality of computer-based devices may be substituted with a single computer-based device. Accordingly, the various functionality that is described as being possessed by more than one device, component, structure, or article may alternatively be possessed by a single device, component, structure, or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Further, the systems and methods described herein are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

For the sake of presentation, the detailed description uses terms like "determine" and "select" to describe computer operations in a computer system. These terms denote operations performed by a computer, and should not be confused with acts performed by a human being. The actual computer operations corresponding to these terms vary depending on implementation. For example, "determining" something can be performed in a variety of manners, and therefore the term "determining" (and like terms) can indicate calculating, computing, deriving, looking up (e.g., in a table, database or data structure), ascertaining, recognizing, and the like.

As used herein, the term "send" denotes any way of conveying information from one component to another component, and the term "receive" denotes any way of getting information at one component from another component. The two components can be part of the same computer system or different computer systems. The information can be passed by value (e.g., as a parameter of a message or function call) or passed by reference (e.g., in a buffer). Depending on context, the information can be communicated directly between the two components or be conveyed through one or more intermediate components. As used herein, the term "connected" denotes an operable communication link between two components, which can be part of the same computer system or different computer systems. The operable communication link can be a wired or wireless network connection, which can be direct or pass through one or more intermediate components (e.g., of a network). Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE INC, John Wiley & Sons, Inc. 2d ed., 1996.

It will be readily apparent that the various methods and algorithms described herein may be implemented by a control system and/or the instructions of the software may be designed to carry out the processes of the present invention.

Where databases and/or data structures are described, it will be understood by one of ordinary skill in the art that (i) alternative database structures to those described may be readily employed, and (ii) other memory structures besides databases may be readily employed. Any illustrations or descriptions of any sample databases/data structure presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

It will be readily apparent that the various methods and algorithms described herein may be implemented by, e.g., appropriately programmed general-purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants may file additional applications to pursue patents for subject matter that has been disclosed and enabled but not claimed in the present application.

The foregoing description discloses only exemplary embodiments of the invention. Modifications of the above disclosed apparatus and methods which fall within the scope of the invention will be readily apparent to those of ordinary skill in the art. For example, although the examples discussed above are illustrated for a gaming market, embodiments of the invention can be implemented for other markets. The gaming system environment of the examples is not intended to suggest any limitation as to the scope of use or functionality of any aspect of the disclosure.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim all that comes within the scope and spirit of these claims.

What is claimed is:

1. An electronic gaming device comprising:

at least one memory with instructions stored thereon; and at least one processor in communication with the at least one memory, wherein the instructions, when executed by the at least one processor, cause the at least one processor to:

cause display of a plurality of input display areas associated with a plurality of input amounts;

receive a first input via a user interface, the first input associated with a first selected input amount;

update display of a first input display area of the plurality of input display areas that is associated with the first selected input amount of the plurality of input amounts to indicate that the first selected input amount has been selected;

determine a first output amount based upon selecting a first multiplier, from a plurality of multipliers stored in the at least one memory, based upon the first multiplier being associated with the first selected input amount in the at least one memory, and applying the first multiplier to a baseline output amount;

cause display of the first output amount and a first indicator associated with the first selected input amount in an output display area;

receive a second input via the user interface, the second input associated with a second selected input amount;

update display of a second input display area of the plurality of input display areas that is associated with the second selected input amount to indicate that the second selected input amount has been selected;

determine a second output amount based upon selecting a second multiplier, from the plurality of multipliers stored in the at least one memory, based upon the second multiplier being associated with the second selected input amount in the at least one memory, and applying the second multiplier to the baseline output amount; and cause display of the second output amount and a second indicator associated with the second selected input amount in the output display area.

2. The electronic gaming device of claim 1, wherein the first indicator comprises the first multiplier.

3. The electronic gaming device of claim 2 wherein the second output amount is in compliance with a uniform expected percentage with respect to the second selected input amount, and wherein the uniform expected percentage is the same across each respective input amount and is implemented based at least in part upon the selection from the plurality of multipliers.

4. The electronic gaming device of claim 2, wherein the instructions further cause the at least one processor to at least one of determine the first output amount or the second output amount based at least in part on a message received from a server computer.

5. The electronic gaming device of claim 1, wherein the instructions further cause the at least one processor to, when the first selected input amount is selected, cause display of another indicator associated with the first selected input amount adjacent to the output display area.

6. The electronic gaming device of claim 1, wherein the instructions further cause the at least one processor to cause display of the second indicator adjacent to the output display area when the second selected input amount is selected.

7. The electronic gaming device of claim 1, wherein the at least one of the first output amount or the second output amount comprises a progressive output amount.

8. The electronic gaming device of claim 1, wherein the instructions further cause the at least one processor to:

receive the first input as input data from the user interface, wherein the input data is associated with selection of the first selected input amount.

9. The electronic gaming device of claim 1, wherein the instructions further cause the at least one processor to:

receive the second input as input data from the user interface, wherein the input data is associated with selection of the second selected input amount.

10. At least one non-transitory computer-readable storage medium with instructions stored thereon that, in response to execution by at least one processor, cause the at least one processor to:

receive a first input via a user interface, the first input associated with a first selected input amount;

cause display of a first input display area of a plurality of input display areas indicating that the first selected input amount of a plurality of input amounts has been selected, wherein the first input display area is associated with the first selected input amount;

determine a first output amount based upon selecting a first multiplier, from a plurality of multipliers stored in the at least one non-transitory computer-readable storage medium, based upon the first multiplier being associated with the first selected input amount in the at least one non-transitory computer-readable storage medium, and applying the first multiplier to a baseline output amount;

cause display of the first output amount and a first indicator associated with the first selected input amount in an output display area;

receive a second input via the user interface, the second input associated with a second selected input amount;

cause display of a second input display area of the plurality of input display areas indicating that the second selected input amount of the plurality of input amounts has been selected, wherein the second input display area is associated with the second selected input amount;

determine a second output amount based upon selecting a second multiplier, from the plurality of multipliers stored in the at least one non-transitory computer-readable storage medium, based upon the second multiplier being associated with the second selected input amount in the at least one non-transitory computer-readable storage medium, and applying the second multiplier to the baseline output amount; and cause display of the second output amount and a second indicator associated with the second selected input amount in the output display area.

11. The at least one non-transitory computer-readable storage medium of claim 10, wherein the first indicator comprises the first multiplier.

12. The at least one non-transitory computer-readable storage medium of claim 10, wherein the instructions further cause the at least one processor to cause display of the second output amount by transmitting at least one message associated with the second output amount to a gaming device, and wherein the gaming device, upon receipt of the at least one message, displays the second output amount.

13. The at least one non-transitory computer-readable storage medium of claim 10, wherein the instructions further cause the at least one processor to at least one of cause display of the first input display area at a gaming device, cause display of the first output amount at the gaming device, cause display of the second input display area at the gaming device, cause display of the second output amount at the gaming device, or cause display of the first or the second indicator at the gaming device by transmitting at least one message to the gaming device.

14. The at least one non-transitory computer-readable storage medium of claim 10, wherein the instructions further cause the at least one processor to:

receive input data from a gaming device, wherein the input data is associated with selection of the first selected input amount at the gaming device; and cause display of the first input display area to be updated at the gaming device by transmitting at least one message to the gaming device.

15. The at least one non-transitory computer-readable storage medium of claim 10, wherein the instructions further cause the at least one processor to:

receive input data from a gaming device, wherein the input data is associated with selection of the second selected input amount at the gaming device; and cause display of the second input display area to be updated at the gaming device by transmitting at least one message to the gaming device.

16. A method of electronic gaming implemented by at least one processor in communication with at least one memory, the method comprising:

causing display of a plurality of input display areas associated with a plurality of input amounts;

receiving a first input via a user interface, the first input associated with a first selected input amount;

updating display of a first input display area of the plurality of input display areas that is associated with the first selected input amount of the plurality of input amounts to indicate that the first selected input amount has been selected;

determining a first output amount based upon selecting a first multiplier, from a plurality of multipliers stored in the at least one memory, based upon the first multiplier being associated with the first selected input amount in the at least one memory, and applying the first multiplier to a baseline output amount;

causing display of the first output amount and a first indicator associated with the first selected input amount in an output display area;

receiving a second input via the user interface, the second input associated with a second selected input amount;

updating display of a second input display area of the plurality of input display areas that is associated with the second selected input amount to indicate that the second selected input amount has been selected;

determining a second output amount based upon selecting a second multiplier, from the plurality of multipliers stored in the at least one memory, based upon the second multiplier being associated with the second selected input amount in the at least one memory, and applying the second multiplier to the baseline output amount; and causing display of the second output amount and a second indicator associated with the second selected input amount in the output display area.

17. The method of claim 16, wherein the second output amount is in compliance with a uniform expected percentage with respect to the second selected input amount, and wherein the uniform expected percentage is the same across each respective input amount and is implemented based at least in part upon the identification selection from the plurality of multipliers.

18. The method of claim 17, further comprising at least one of determining the first output amount or the second output amount based at least in part on at least one message received from a server computer.

19. The method of claim 16, further comprising, when the first selected input amount is selected, causing display of another indicator associated with the first selected input amount adjacent to the output display area.

20. The method of claim 16, further comprising:

receiving the first input as first input data from the user interface, wherein the first input data is associated with selection of the first selected input amount; and receiving the second input as second input data from the user interface, wherein the second input data is associated with selection of the second selected input amount.

* * * * *